(12) United States Patent
Ziemann et al.

(10) Patent No.: US 7,516,139 B2
(45) Date of Patent: Apr. 7, 2009

(54) PROCESSING OF TREE DATA STRUCTURES

(75) Inventors: David M. Ziemann, London (GB); John F. Samuel, London (GB)

(73) Assignee: JP Morgan Chase Bank, New York, NY (US)

(*) Notice: Subject to any disclaimer, the term of this patent is extended or adjusted under 35 U.S.C. 154(b) by 565 days.

(21) Appl. No.: 10/802,606

(22) Filed: Mar. 17, 2004

(65) Prior Publication Data

US 2005/0065963 A1    Mar. 24, 2005

Related U.S. Application Data

(60) Provisional application No. 60/504,400, filed on Sep. 19, 2003.

(51) Int. Cl.
*G06F 17/30* (2006.01)
(52) U.S. Cl. .................................................... 707/100
(58) Field of Classification Search .............. 707/2–5, 707/100, 6, 10
See application file for complete search history.

(56) References Cited

U.S. PATENT DOCUMENTS

| | | | |
|---|---|---|---|
| 3,872,448 A | 3/1975 | Mitchell, Jr. | |
| 5,159,687 A | 10/1992 | Richburg | |
| 5,168,444 A | 12/1992 | Cukor et al. | |
| 5,202,986 A * | 4/1993 | Nickel ............................ | 707/3 |
| 5,278,982 A | 1/1994 | Daniels et al. | |
| 5,313,616 A | 5/1994 | Cline et al. | |
| 5,347,518 A | 9/1994 | Lee | |
| 5,455,946 A | 10/1995 | Mohan et al. | |
| 5,471,613 A * | 11/1995 | Banning et al. ................ | 707/4 |
| 5,630,173 A | 5/1997 | Oprescu | |
| 5,701,471 A | 12/1997 | Subramanyam | |
| 5,748,878 A | 5/1998 | Rees et al. | |
| 5,752,034 A | 5/1998 | Srivastava | |
| 5,758,061 A | 5/1998 | Plum | |
| 5,764,972 A | 6/1998 | Crouse et al. | |

(Continued)

FOREIGN PATENT DOCUMENTS

WO      95/03586      2/1995

(Continued)

OTHER PUBLICATIONS

H.V. Jagadish et al., "TIMBER: A native XML database", The VLDB Journal, Dec. 19, 2002, pp. 274-291.*

(Continued)

*Primary Examiner*—Cheryl Lewis
(74) *Attorney, Agent, or Firm*—Lowenstein Sandler PC

(57) ABSTRACT

Data items are represented by trees and stored in a database, the collection of data items defining a forest. Queries and masks are also represented by trees. A method for navigating the forest of data items is disclosed in the context of a graphical user interface. A set of operations on trees are defined such that the data items can be queried on the basis of structure as well as node values. That is, the query can include a specification of the relationship between nodes in a tree, as well as the data in the nodes themselves. Exemplary implementations of such operations are disclosed in the context of a database update procedure. Additionally disclosed are methods for efficiently storing and processing the forest of data items.

10 Claims, 22 Drawing Sheets

| Tree 1 | Tree 2 | Result |
|---|---|---|
| 802-perturbation=tweak-804<br>  806-curve=irSwaption Vol.-824<br>    822-ccy="AUD"<br>    826-index="SWAP"<br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" | 802-perturbation=tweak-804<br>  806-curve=?<br><br><br><br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" | 802-perturbation=tweak-804<br>  806-curve=irSwaption Vol.-824<br>    822-ccy="AUD"<br>    826-index="SWAP"<br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" |

U.S. PATENT DOCUMENTS

| | | |
|---|---|---|
| 5,774,553 A | 6/1998 | Rosen |
| 5,784,557 A | 7/1998 | Oprescu |
| 5,787,402 A | 7/1998 | Potter et al. |
| 5,828,883 A | 10/1998 | Hall |
| 5,832,523 A | 11/1998 | Kanai et al. |
| 5,835,770 A | 11/1998 | Shum et al. |
| 5,845,293 A | 12/1998 | Veghte et al. |
| 5,872,976 A | 2/1999 | Yee et al. |
| 5,907,846 A | 5/1999 | Berner et al. |
| 5,920,719 A | 7/1999 | Sutton et al. |
| 5,978,477 A | 11/1999 | Hull et al. |
| 6,009,405 A | 12/1999 | Leymann et al. |
| 6,012,087 A | 1/2000 | Freivald et al. |
| 6,014,671 A | 1/2000 | Castelli et al. ............. 707/101 |
| 6,026,237 A | 2/2000 | Berry et al. |
| 6,029,002 A | 2/2000 | Afifi et al. |
| 6,058,393 A | 5/2000 | Meier et al. |
| 6,065,009 A | 5/2000 | Leymann et al. |
| 6,081,808 A | 6/2000 | Blackman et al. |
| 6,108,698 A | 8/2000 | Tenev et al. |
| 6,125,390 A | 9/2000 | Touboul |
| 6,138,112 A | 10/2000 | Slutz |
| 6,145,121 A | 11/2000 | Levy et al. |
| 6,163,776 A | 12/2000 | Periwal |
| 6,188,400 B1 | 2/2001 | House et al. |
| 6,226,652 B1 | 5/2001 | Percival et al. |
| 6,237,143 B1 | 5/2001 | Fontana et al. |
| 6,243,862 B1 | 6/2001 | Lebow |
| 6,256,635 B1 | 7/2001 | Arrouye et al. |
| 6,263,121 B1 | 7/2001 | Melen et al. |
| 6,266,683 B1 | 7/2001 | Yehuda et al. |
| 6,269,479 B1 | 7/2001 | Puram |
| 6,279,008 B1 | 8/2001 | Tung Ng et al. |
| 6,301,701 B1 | 10/2001 | Walker et al. |
| 6,311,320 B1 | 10/2001 | Jibbe |
| 6,311,327 B1 | 10/2001 | O'Brien et al. |
| 6,336,122 B1 | 1/2002 | Lee et al. |
| 6,356,920 B1 | 3/2002 | Vandersluis ............... 707/501 |
| 6,381,609 B1 | 4/2002 | Breitbart et al. |
| 6,385,618 B1 | 5/2002 | Ng et al. |
| 6,397,221 B1 | 5/2002 | Greef et al. |
| 6,405,209 B2 | 6/2002 | Obendorf |
| 6,411,957 B1 | 6/2002 | Dijkstra .................... 707/100 |
| 6,418,446 B1 | 7/2002 | Lection et al. ............. 707/103 |
| 6,418,448 B1 | 7/2002 | Sarkar |
| 6,418,451 B1 | 7/2002 | Maimone |
| 6,449,623 B1 | 9/2002 | Bohannon et al. |
| 6,453,310 B1 | 9/2002 | Zander |
| 6,456,995 B1 | 9/2002 | Salo et al. |
| 6,467,052 B1 | 10/2002 | Kaler et al. |
| 6,477,540 B1 | 11/2002 | Singh et al. |
| 6,490,581 B1 | 12/2002 | Neshatfar et al. |
| 6,502,095 B2 | 12/2002 | Breitbart et al. |
| 6,502,104 B2 | 12/2002 | Fung et al. |
| 6,532,467 B1 | 3/2003 | Brocklebank et al. ....... 707/100 |
| 6,535,894 B1 | 3/2003 | Schmidt et al. |
| 6,539,337 B1 | 3/2003 | Provan et al. |
| 6,539,383 B2 | 3/2003 | Charlet et al. |
| 6,539,397 B1 | 3/2003 | Doan et al. |
| 6,539,398 B1 | 3/2003 | Hannan et al. |
| 6,557,039 B1 | 4/2003 | Leong et al. |
| 6,571,249 B1 | 5/2003 | Garrecht et al. ............. 707/100 |
| 6,574,640 B1 | 6/2003 | Stahl |
| 6,578,129 B1 | 6/2003 | da Silva, Jr. et al. ........ 711/209 |
| 6,591,260 B1 | 7/2003 | Schwarzhoff et al. .......... 707/2 |
| 6,601,075 B1 | 7/2003 | Huang et al. |
| 6,651,076 B1 | 11/2003 | Asano |
| 6,665,086 B2 | 12/2003 | Hull et al. |
| 6,678,705 B1 | 1/2004 | Berchtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,763,384 B1 | 7/2004 | Gupta et al. |
| 6,880,010 B1 | 4/2005 | Webb et al. |
| 6,918,013 B2 | 7/2005 | Jacobs et al. |
| 6,938,072 B2 | 8/2005 | Berman et al. |
| 2002/0007287 A1 | 1/2002 | Straube et al. |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0049666 A1 | 4/2002 | Reuter et al. |
| 2002/0065695 A1 | 5/2002 | Francoeur et al. |
| 2002/0083034 A1 | 6/2002 | Orbanes et al. ................ 707/1 |
| 2002/0091702 A1 | 7/2002 | Mullins |
| 2002/0116205 A1 | 8/2002 | Ankireddipally et al. |
| 2002/0143774 A1 | 10/2002 | Vandersluis .................. 707/10 |
| 2002/0144101 A1 | 10/2002 | Wang et al. |
| 2002/0178439 A1 | 11/2002 | Rich et al. |
| 2002/0188765 A1 | 12/2002 | Fong et al. |
| 2003/0014421 A1 | 1/2003 | Jung ......................... 707/102 |
| 2003/0018666 A1 | 1/2003 | Chen et al. |
| 2003/0027561 A1 | 2/2003 | Iyer |
| 2003/0046313 A1 | 3/2003 | Leung et al. |
| 2003/0050931 A1 | 3/2003 | Harman et al. .............. 707/100 |
| 2003/0069975 A1 | 4/2003 | Abjanic et al. |
| 2003/0070158 A1 | 4/2003 | Lucas et al. |
| 2003/0088593 A1 | 5/2003 | Stickler ...................... 707/205 |
| 2003/0126151 A1 | 7/2003 | Jung ......................... 707/100 |
| 2003/0131007 A1 | 7/2003 | Schirmer et al. ............ 707/100 |
| 2003/0140045 A1 | 7/2003 | Heninger et al. |
| 2003/0140308 A1 | 7/2003 | Murthy et al. |
| 2003/0145047 A1 | 7/2003 | Upton |
| 2003/0163603 A1 | 8/2003 | Fry et al. |
| 2003/0167266 A1 | 9/2003 | Saldanha et al. ................ 707/6 |
| 2003/0167445 A1 | 9/2003 | Su et al. |
| 2003/0177118 A1 | 9/2003 | Moon et al. |
| 2003/0177341 A1 | 9/2003 | Devillers |
| 2003/0191849 A1 | 10/2003 | Leong et al. |
| 2003/0217033 A1 | 11/2003 | Sandler et al. |
| 2003/0217083 A1 | 11/2003 | Taylor |
| 2004/0060006 A1 | 3/2004 | Lindblad et al. |
| 2004/0122872 A1 | 6/2004 | Pandya et al. |
| 2005/0027658 A1 | 2/2005 | Moore et al. |
| 2005/0060345 A1 | 3/2005 | Doddington |
| 2005/0065964 A1* | 3/2005 | Ziemann et al. ............. 707/102 |
| 2005/0065965 A1* | 3/2005 | Ziemann et al. ............. 707/102 |
| 2005/0065987 A1 | 3/2005 | Telknowski et al. |

FOREIGN PATENT DOCUMENTS

| | | |
|---|---|---|
| WO | 96/34350 | 10/1996 |
| WO | 02/46980 | 6/2002 |

OTHER PUBLICATIONS

Van Bommel, P., et al., "Genetic Algorithms for Optimal Logical Database Design" Information and Software Technology, 36(12):725-732, 1994.

Xu et al., "ERDraw: An XML-based ER-diagram Drawing and Translation Tool", date unknown, but available at http://www.cs.wayne.edu/~shiyong/papers/cata03.pdf as of Mar. 16, 2004.

Yahfoufi et al., "A Self-Stabilizing Distributed Branch-and-Bound Algorithm", Laboratoire Prism, University of Versailles, date unknown.

van Steen et al., "Model for Worldwide Tracking of Distributed Objects" Proceedings of the TINA Conference (1996).

Hellerstein, J., "GiST: A Generalized Search Tree for Database Systems", UC Berkeley, Jan. 19, 1996, pp. 1-28.

Ramakrishnan, R., "Tree-Structured Indexes Module 2, Lectures 3 and 4, Database Management Systems", pp. 1-26, date unknown, but available at http://www.cs.ust.hk/faculty/dimitris/COMP530/notes/I6.pdf as of Mar. 16, 2004.

Chen et al., "Improving Index Performance through Prefetching", School of Computer Science, Carnegie Mellon University, CMU-CS-00-177, Dec. 2000.

Deng et al.; A Probabilistic Approach to Fault Diagnosis in Linear Lightwave Networks, Department of Electrical Engineering, May 1992; pp. 1-22.

Deutsch et al., Storing Semistructured Data With Stored, Proceedings of the 1999 ACM SIGMOD International Conference on Management of Data, ACM, 1999, pp. 431-442.

Duggan; 2.40 General—Reviews and Abstracts, SPI Database of Software Technologies, p. 1-5, Feb. 1, 1974.

Hilbert, et al., An Approach to Large Scale Collection of Application Usage Data Over the Internet, Software Engineering 1998, Proceedings of the 1998 International Conference, Abstract, Apr. 1998.

Jagadish et al., TAX: A Tree Algebra for XML, Springer-Veriag, 202, pp. 149-164.

Jagadish et al., TIMBER, A Native XML Database, Published Online; Dec. 19, 2002, Springer-Veriag, pp. 274-291.

Moser; Transactions in a Distributed Object Environment, Department of Electrical and Computer Engineering, Jun. 19, 2005.

Quantitative Monitoring of Software Development by Time-Based and Intercheckpoint Monitoring, Software Engineering Journal, vol. 5, Iss. 1, Abstract, Jan. 1990.

Sammet; Beginning of 4.6 Software Evaluation, Tests and Measurements and RMF I/O Time Validation, Association of Computing Machinery, p. 519.

Strom et al.; GRYPHON: An Information Flow Based Approach to Message Brokering, International Symposium on Software Reliability, Jun. 20, 2005.

Jagadish et al., TAX: A Tree Algebra for XML, Springer-Veriag, 202, pp. 149-164, Jan. 2002.

Sammet; Beginning of 4.6 Software Evaluation, Tests and Measurements and RMF I/O Time Validation, Association of Computing Machinery, p. 519, Jan. 2002.

* cited by examiner

Figure 2a

| Steps | Query Tree | Choice | No. Trees |
|---|---|---|---|
| 1 | ?-210 | resultCashflow<br>resultMTM-212<br>resultPosition | 11,187,650 |
| 2 | resultMTM-212<br>  finObject=?<br>  vc=?<br>  mtm=?<br>  businessDate=?-214<br>  status=?<br>  provenance=? | 2Jul2003<br>3Jul2003<br>4Jul2003<br>7Jul2003<br>8Jul2003<br>9Jul2003<br>10Jul2003<br>11Jul2003<br>14Jul2003-216 | 4,780,652 |
| 3 | resultMTM-212<br>  finObject=?<br>  vc=?-218<br>  mtm=?<br>  businessDate=14Jul2003<br>  status=?<br>  provenance=? | vc-220 | 522,404 |
| 4 | resultMTM<br>  finObject=?<br>  vc=vc-218<br>    env=?-222<br>    valueDate=?<br>    scenarioLabel=?<br>    scenarioID=?<br>  mtm=?<br>  businessDate=14Jul2003<br>  status=?<br>  provenance=? | baseEnv-224<br>perturbEnv<br>regenEnv<br>replaceEnv | 522,404 |
| 5 | resultMTM<br>  finObject=?-226<br>  vc=vc<br>    env=baseEnv<br>      date=?<br>      name=?<br>    valueDate=?<br>    scenarioLabel=?<br>    scenarioID=?<br>  mtm=?<br>  businessDate=14Jul2003<br>  status=?<br>  provenance=? | trade-228 | 15,956 |

Figure 2b

| Steps | Query Tree | Choice | No. Trees |
|---|---|---|---|
| 6 | resultMTM<br>  finObject=trade<br>    name=?<br>    version=?<br>    book=?<br>    portfolio=?-230<br>    vc=vc<br>      env=baseEnv<br>        date=?<br>        name=<br>      valueDate=?<br>      scenarioLabel=?<br>      scenarioID=?<br>    mtm=?<br>    businessDate=14Jul2003<br>    status=?<br>    provenance=? | I_OFFICIAL_INTFX_Fx_Fwds<br>I_OFFICIAL_INTFX_Fx_Options<br>I_OFFICIAL_INTFX_MultiCcy_Swap<br>I_OFFICIAL_INTFX_SingleCcy_Swap<br>I_OFFICIAL_INTFX_Vanilla_Turbos<br>JPY_USD_Binary-232<br>JPY_USD_Binary_StepDown<br>JPY_USD_Non_Capped_KO<br>MultiCcy_Binary<br>USD_JPY_Capped_Turbos_Callable | 15,956 |
| 7 | resultMTM<br>  finObject=trade<br>    name=?<br>    version=?<br>    book=?<br>    portfolio=JPY_USD_Binary<br>    vc=vc<br>      env=baseEnv<br>        date=?<br>        name=?<br>      valueDate=?<br>      scenarioLabel=?<br>      scenarioID=?<br>    mtm=?<br>    businessDate=14Jul2003<br>    status=?<br>    provenance=? | | 126 |

Figure 3

| finObject.name | finObject.version | finObject.book | finObject.portfolio | vc.env.date | vc.env.name | vc.valueDate | businessDate | status |
|---|---|---|---|---|---|---|---|---|
| I_Underlier_2435342 | 0 | OfficialIntFXBook | JPY_USD_Binary | 2003-07-11 | IntFXMO | 2003-07-11 | 2003-07-14 | Present |
| I_Underlier_3273872 | 0 | OfficialIntFXBook | JPY_USD_Binary | 2003-07-11 | IntFXMO | 2003-07-11 | 2003-07-14 | Present |
| I_Underlier_4455342 | 0 | OfficialIntFXBook | JPY_USD_Binary | 2003-07-11 | IntFXMO | 2003-07-11 | 2003-07-14 | Present |
| I_Underlier_5344442 | 0 | OfficialIntFXBook | JPY_USD_Binary | 2003-07-11 | IntFXMO | 2003-07-11 | 2003-07-14 | Present |
| I_Underlier_6744449 | 0 | OfficialIntFXBook | JPY_USD_Binary | 2003-07-11 | IntFXMO | 2003-07-11 | 2003-07-14 | Present |

Figure 5

| finObject.name | finObject.version | vc.env.date | vc.env.name | vc.valueDate | mtm.amount | mtm.ccy | businessDate | status |
|---|---|---|---|---|---|---|---|---|
| I_Underlier_2435342 | 0 | 2003-07-11 | IntFXMO | 2003-07-11 | -763001.40 | USD | 2003-07-14 | Present |
| I_Underlier_3273872 | 0 | 2003-07-11 | IntFXMO | 2003-07-11 | -138797.17 | USD | 2003-07-14 | Present |
| I_Underlier_4455342 | 0 | 2003-07-11 | IntFXMO | 2003-07-11 | -529622.00 | USD | 2003-07-14 | Present |
| I_Underlier_5344442 | 0 | 2003-07-11 | IntFXMO | 2003-07-11 | 0.00 | USD | | |
| I_Underlier_6744449 | 0 | 2003-07-11 | IntFXMO | 2003-07-11 | -290438.07 | USD | 2003-07-14 | Present |

Figure 4

| Steps | Query Tree | Choice | No. Trees |
|---|---|---|---|
| 8 | resultMTM<br>    finObject=trade<br>        name=?<br>        version=?<br>        book=?<br>        portfolio=JPY_USD_Binary<br>    vc=vc<br>        env=baseEnv<br>           date=?<br>           name=?<br>        valueDate=?<br>        scenarioLabel=?<br>        scenarioID=?<br>    mtm=-402<br>    businessDate=14Jul2003<br>    status=?<br>    provenance=? | money-404 | 126 |
| 9 | resultMTM<br>    finObject=trade<br>        name=?<br>        version=?<br>        book=?<br>        portfolio=JPY_USD_Binary<br>    vc=vc<br>        env=baseEnv<br>           date=?<br>           name=?<br>        valueDate=?<br>        scenarioLabel=?<br>  402  scenarioID=?<br>    mtm=money-404<br>        amount=?-502<br>        ccy=?-504<br>    businessDate=14Jul2003<br>    status=?<br>    provenance=? |  | 126 |

Figure 6

| Steps | Query Tree | Choice | No. Trees |
|---|---|---|---|
| 10 | resultMTM<br>    finObject=trade<br>        name=?<br>        version=?<br>        book=?<br>        portfolio=JPY_USD_Binary<br>    vc=vc<br>        env=baseEnv<br>            date=?<br>            name=?<br>        valueDate=?<br>        scenarioLabel=?<br>        scenarioID=?<br>    mtm=money<br>        amount=?<br>        ccy=?<br>    businessDate=14Jul2003<br>    status=?<br>    provenance=-602 | provenance-604 | 126 |
| 11 | resultMTM<br>    finObject=trade<br>        name=?<br>        version=?<br>        book=?<br>        portfolio=JPY_USD_Binary<br>    vc=vc<br>        env=baseEnv<br>            date=?<br>            name=?<br>        valueDate=?<br>        scenarioLabel=?<br>        scenarioID=?<br>    mtm=money<br>        amount=?<br>        ccy=?<br>    businessDate=14Jul2003<br>    status=?<br>    provenance=provenance<br>        source=?<br>        time=? |  | 126 |

Figure 7

| finObject.name | vc.env.date | vc.env.name | mtm.amount | mtm.ccy | businessDate | status | provenance.source | provenance.time |
|---|---|---|---|---|---|---|---|---|
| I_Underlier_2435342 | 2003-07-11 | IntFXMO | -763001.40 | USD | 2003-07-14 | Present | hpc_UpOnlyRun | 14Jul2003 21:20:41 |
| I_Underlier_3273872 | 2003-07-11 | IntFXMO | -138797.17 | USD | 2003-07-14 | Present | hpc_UpOnlyRun | 14Jul2003 21:20:41 |
| I_Underlier_4455342 | 2003-07-11 | IntFXMO | -529622.00 | USD | 2003-07-14 | Present | hpc_UpOnlyRun | 14Jul2003 21:20:41 |
| I_Underlier_5344442 | 2003-07-11 | IntFXMO | 0.00 | USD | 2003-07-14 | Present | hpc_UpOnlyRun | 15Jul2003 3:22:49 |
| I_Underlier_6744449 | 2003-07-11 | IntFXMO | -290438.07 | USD | 2003-07-14 | Present | hpc_UpOnlyRun | 15Jul2003 3:22:49 |

Figure 8

| Tree 1 | Tree 2 |
|---|---|
| 802-perturbation = tweak-804<br>  806-curve = ?<br><br>  808-point = ?<br><br>  810a-tweakSpec = tweakSpec-810b<br>    812-spec = perturbationSpec-814<br>      816-direction = "UP"<br>      818-amount = "1" | 802-perturbation = tweak-804<br>  806-curve = irCurve-820<br>    823-ccy = "USD"<br><br>  808-point = curvePoint-828<br>    830-maturity = "1Y"<br><br>  810a-tweakSpec = tweakSpec-810b<br>    812-spec = perturbationSpec-814<br>      816-direction = "UP"<br>      818-amount = "1" |

| Tree 3 | Tree 4 |
|---|---|
| 802-perturbation = tweak-804<br>  806-curve = irSwaptionVol-824<br>    822-ccy = "USD"<br>    826-index = "SWAP"<br>  808-point = irVolPoint-832<br>    830-maturity = "1Y"<br>    834-tenor = ?<br>  810a-tweakSpec = tweakSpec-810b<br>    812-spec = perturbationSpec-814<br>      816-direction = "UP"<br>      818amount = "1" | 802-perturbation = tweak-804<br>  806-curve = irSwaptionVol-824<br>    822-ccy = "USD"<br>    826-index = ?<br>  808-point = irVolPoint-832<br>    830-maturity = "1Y"<br>    834-tenor = ?<br>  810a-tweakSpec = _ |

Figure 9

| Tree 1 | Tree 2 | Result |
|---|---|---|
| 802-perturbation=tweak-804<br>  806-curve=irSwaption Vol.-824<br>    822-ccy="AUD"<br>    826-index="SWAP"<br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" | 802-perturbation=tweak-804<br>  806-curve=?<br><br><br><br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" | 802-perturbation=tweak-804<br>  806-curve=irSwaption Vol.-824<br>    822-ccy="AUD"<br>    826-index="SWAP"<br>  808-point =irVolPoint-832<br>    830-maturity="1Y"<br>    834-tenor="5Y"<br>  810a-tweakSpec = tweakSpec-810b<br>    812-spec = perturbationSpec-814<br>      816-direction = "UP"<br>      818-amount = "1" |

Figure 10

| Tree 1 | Tree 2 | Result |
|---|---|---|
| 802-perturbation = tweak-804<br>806-curve = irSwaptionVol-824<br>    822-ccy= "AUD"<br>    826-index = "SWAP"<br>808-point = irVolPoint-832<br>    830-maturity = "1Y"<br>    834-tenor = "5Y"<br>810a-tweakSpec = tweakSpec-810b<br>812-spec = perturbationSpec-814<br>    816-direction = "UP"<br>    818-amount = "1" | 802-perturbation = tweak-804<br>806-curve = ___<br><br><br><br>808-point = irVolPoint-832<br>    830-maturity = "1Y"<br>    834-tenor = "5Y"<br>810a-tweakSpec = tweakSpec-810b<br>812-spec = perturbationSpec-814<br>    816-direction = "UP"<br>    818-amount = "1" | 802-perturbation = tweak<br>806-curve = ___<br><br><br><br>808-point = irVolPoint-832<br>    830-maturity = "1Y"<br>    834-tenor = "5Y"<br>810a-tweakSpec = tweakSpec-810b<br>812-spec = perturbationSpec-814<br>    816-direction = "UP"<br>    818-amount = "1" |

Figure 11

| Tree 1 | Tree 2 | Result |
|---|---|---|
| 802-perturbation = tweak-804<br>806-curve = irSwaptionVol-824<br>  822-ccy= "AUD"<br>  826-index = "SWAP"<br>808-point = irVolPoint-832<br>  830-maturity = "1Y"<br>  834-tenor = "5Y"<br>810a-tweakSpec = tweakSpec-810b<br>812-spec = perturbationSpec<br>  816-direction = "UP"<br>  818-amount = "1" | 802-perturbation = tweak-804<br>806-curve = ?<br><br>808-point = —<br><br>810a-tweakSpec = ? | 802-perturbation = tweak-804<br>806-curve = irSwaptionVol-824<br>  822-ccy = "AUD"<br>  826-index = "SWAP"<br>808-point = —<br><br>810a-tweakSpec = tweakSpec-810b<br>812-spec = perturbationSpec-814<br>  816-direction = "UP"<br>  818-amount = "1" |

Figure 12

| Tree 1 | Tree 2 | Result |
|---|---|---|
| 802-perturbation = tweak-804<br>806-curve = irSwaptionVol-824<br>  822-ccy= "AUD"<br>  826-index = "SWAP"<br>808-point = irVolPoint-832<br>  830-maturity = "1Y"<br>  834-tenor = "5Y"<br>810a-tweakSpec = tweakSpec-810b<br>812-spec = perturbationSpec<br>  816-direction = "UP"<br>  818-amount = "1" | 802-perturbation = tweak-804<br>806-curve = ?<br><br><br><br>808-point = ?<br><br><br>810a-tweakSpec = __ | 802-perturbation = tweak-804<br>806-curve = ?<br><br><br><br>808-point = ?<br><br><br>810a-tweakSpec = tweakSpec-810b<br>812-spec = perturbationSpec-814<br>  816-direction = "UP"<br>  818-amount = "1" |

Figure 13

| Tree 1 | Tree 2 | Tree 3 |
|---|---|---|
| 802-perturbation = tweak-804 | 802-perturbation = tweak-804 | 802-perturbation = tweak-804 |
| 806-curve = irCurve-820 | 806-curve = irSwaptionVol-824 | 806-curve = irSwaptionVol-824 |
|    823-ccy="USD" |    822-ccy = "USD" |    822-ccy= "AUD" |
| |    826-index = "SWAP" |    826-index = "SWAP" |
| 808-point = curvePoint-828 | 808-point = irVolPoint-832 | 808-point = irVolPoint-832 |
|    830-maturity = "1Y" |    830-maturity = "1Y" |    830-maturity = "1Y" |
| |    834-tenor = "2Y" |    834-tenor = "5Y" |
| 810a-tweakSpec = tweakSpec-810b | 810a-tweakSpec = tweakSpec-810b | 810a-tweakSpec = tweakSpec-810b |
| 812-spec = perturbationSpec-814 | 812-spec = perturbationSpec-814 | 812-spec = perturbationSpec-814 |
|    816-direction = "UP" |    816-direction = "UP" |    816-direction = "UP" |
|    818-amount = "1" |    818-amount = "1" |    818-amount = "1" |

Figure 14

```
              1402
             /    1404  1408
            /    /     /
resultPosition  /     /
     finObject=trade
            name=?-1410
  218-vc=vc-220
        222-env=perturbEnv-1412
              802-perturbation=tweak-804
                   806-curve=irCurve-820
                            ccy=?-823
                   808-point=curvePoint-828
                            maturity=?-830
                   810a-tweakSpec=tweakSpec-810b
                            812-spec=perturbationSpec-814
                                 direction=?-816
                                 amount=?-818

1406-delta=money-1414
  1416-amount=?
```

Figure 15

```
resultPosition            1502
     finObject=trade     /
     1410-name="Trade1"
     vc=vc
          env=perturbEnv
               perturbation=tweak
                    curve=irCurve
                     823-ccy="EUR"-1504
                    point=curvePoint-828
                         maturity=?-830
                    tweakSpec=tweakSpec-810b
                         spec=perturbationSpec-814
                           816-direction="UP"-1506
                           818-amount=?
          delta=money
               amount=?
```

Figure 16

```
resultPosition
    finObject=trade
    1410-name=_
    vc=vc
        env=perturbEnv
            perturbation=tweak
                curve=irCurve
                    ccy=_-823
             808-point=?
                tweakSpec=tweakSpec
                    spec=perturbationSpec-814
                        816- direction=_
                        818- amount=?
    1406-delta=money-1414
        1416-amount=?
```

Figure 17

```
resultPosition           1502
    finObject=trade      /
    1410-name="Trade1"
    vc=vc
        env=perturbEnv
            perturbation=tweak
                curve=irCurve
                 823- ccy="EUR"-1504
                point=?-1702
                tweakSpec=tweakSpec
                    spec=perturbationSpec
                        816- direction="UP"-1506
                            amount=?
        delta=money
            amount=?
```

Figure 18

Query Tree 1: resultPosition  /1502
    finObject=trade
    1410—name="Trade1"
    vc=vc
        env=perturbEnv
            perturbation=tweak
                curve=irCurve
                 823—ccy="USD"-1802
                point=?-1702
                tweakSpec=tweakSpec
                      spec=perturbationSpec
                        816—direction="UP"-1506
                        amount=?

delta=money
        amount=?

Query Tree 2: resultPosition  /1502
    finObject=trade
    1410—name="Trade1"
    vc=vc
        env=perturbEnv
            perturbation=tweak
                curve=irCurve
                 823—ccy="USD"-1802
                point=?-1702
                tweakSpec=tweakSpec
                      spec=perturbationSpec
                        816—direction="DN"-1804
                        amount=?

delta=money
        amount=?

Figure 19

```
resultPosition
    finObject=trade
        name=?
    vc=vc
        env=perturbEnv
            perturbation=tweak
                806-curve=_
                    point=?
                    tweakSpec=tweakSpec
                        spec=perturbationSpec
                            direction=_
                            amount=?
        delta=money
            amount=?
```

Figure 20

```
resultPosition
    finObject=trade
        name=?
    vc=vc
        env=perturbEnv
            perturbation=tweak
                806-curve=irSwaptionVol-824
                    822-ccy="AUD"-2002
                    826-index="SWAP"-2004
                    point=?
                    tweakSpec=tweakSpec
                        spec=perturbationSpec-814
                            816-direction="UP"-1506
                            amount=?
        delta=money
            amount=?
```

Figure 21

```
resultPosition
    finObject=trade
    1410—name=_
    vc=vc
        env=perturbEnv
            802—perturbation=tweak-804
                806—curve=_
                808—point=_
                    tweakSpec=tweakSpec
                        spec=perturbationSpec
                            816—direction=_
                                amount=?
        delta=money
            amount=?
```

Figure 22

```
resultPosition              2204
    finObject=trade        /
    1410—name="Trade2"
    vc=vc
        env=perturbEnv
            perturbation=tweak
                806—curve=irCurve-820
                    823—ccy="EUR"-1504
                808—point=curvePoint-828
                    830—maturity="3Y"-2202
                    tweakSpec=tweakSpec
                        spec=perturbationSpec
                            816—direction="UP"-1506
                                amount=?
        delta=money
            amount=?
```

Figure 23 resultPosition
    finObject=trade
        name=_
    vc=vc
        env=perturbEnv
            perturbation=tweak
                curve=irCurve
                    ccy=_
                tweakSpec=tweakSpec
                    spec=perturbationSpec
                        direction=_
    delta=money

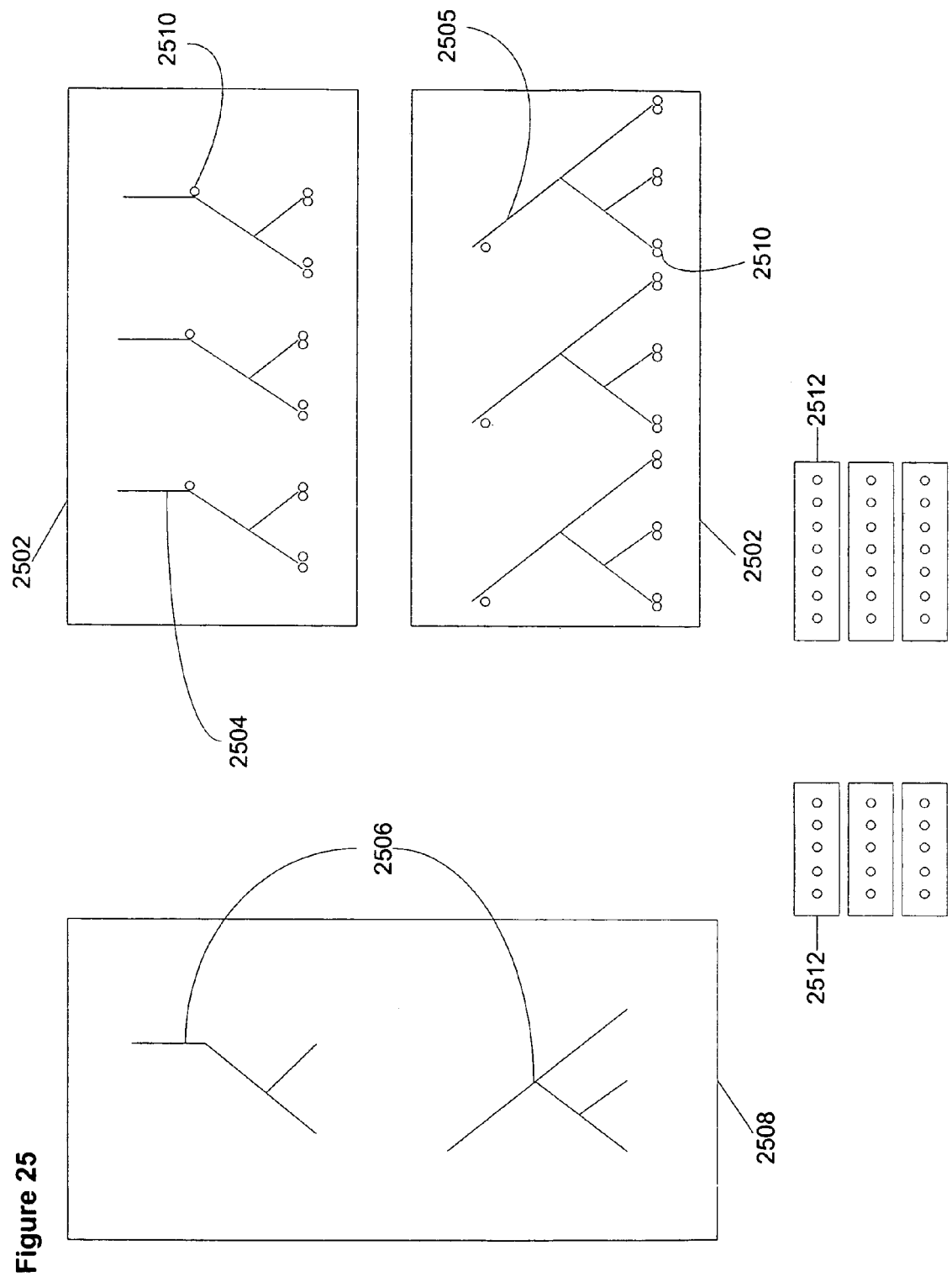

PROCESSING OF TREE DATA STRUCTURES

CROSS-REFERENCE TO RELATED APPLICATIONS

This application claims the benefit of U.S. Provisional Application No. 60/504,400, filed Sep. 19, 2003, the entire disclosure of which is hereby incorporated herein by reference in its entirety. This application is also related to U.S. patent application Ser. No. 10/802,710, abandoned, entitled "Navigation of Tree Data Structures" by David M. Ziemann and John F. Samuel, and to U.S. patent application Ser. No. 10/802,614, abandoned, entitled "Update of a Tree-Based Database" by David M. Ziemann and John F. Samuel, both of which are filed concurrently herewith on Mar. 17, 2004 and incorporated herein by reference in their entirety.

FIELD OF THE INVENTION

This invention relates to the field of databases, and, more specifically, to a system that uses tree data structures to represent, exchange, query, store, update, and navigate data.

BACKGROUND OF THE INVENTION

This invention is often discussed herein in the context of financial risk management, but this invention is much broader in its application because the tree-based database according to this invention may be used for literally any type of heterogeneous data.

Financial risk-management systems rely on complex object models for the storage, query and update of data. Each point of the data is derived from a diverse set of inputs that depend on market data, trade details and configured parameters. The number and type of these inputs differs widely among different categories of risk exposure; however, the risk manager needs to see the data as a single, unified search space for reporting and analysis.

The same applies for any other type of complex system that relies on a wide range of different data structures. As will be discussed in the following sections, conventional database models fail to adequately support such complex systems and fail to provide a unified search space for the query and aggregation of results.

The Relational Database Model

The conventional relational model is often used as the foundation for financial risk management systems. The strength of the relational model is presenting and manipulating tabular collections of data where each column of data has the same structure. However, it does not easily lend itself to representing collections of data with diverse structures.

If a relational database model is adapted to support widely diverse data structures, one of two approaches are typically adopted. In the first approach, the structural aspects of the database are increased in complexity in order to accommodate the diverse data structures. For instance, every distinct structure may be represented with a separate table linked to a primary table with a "key." Each distinct structure also has its own procedures for query and update. This approach is very inflexible, and in the worst case, the addition of a new structure requires all the procedures to be rewritten.

In the second approach, the relational database is simplified in order to make all data elements fit the same structure. This approach leads to redundancy and expansion of storage requirements in the database. For example, a scalar value (i.e., a zero dimensional point) might have additional, redundant x and y values so that one and two-dimensional points can be stored in the same table. Any new structures that do not fit the database structure either have to be trimmed to fit or result in a restructuring of all the data and procedures.

Object-Oriented Databases

Objected oriented databases address the problems of the domain model by encapsulating behavior and state into a single object. Provided that the objects implement an appropriate application program interface (API), it is possible to have collections of heterogeneous data. Further, new structures may be added to the database without requiring a major code rewrite. However, the drawback of object-oriented databases is that they are extremely difficult to access by external systems.

XML

XML, while not really a system, is widely used for the transfer of data between systems and has a growing following in the financial-risk management world. In XML, data is structured in a tree-like fashion, with named parts.

As a means to transfer data, XML has many advantages. For example, many APIs to other applications exist and it is flexible and extensible. However, XML does not offer any storage, update or query mechanism and the XML representation of objects is too verbose to be an option for storing data.

SUMMARY OF THE INVENTION

These problems are solved and a technical advance is achieved in the art by a system and method that uses trees to represent, exchange, query, store and update data. In terms of what can be represented, this system has the flexibility of XML, but also provides a storage mechanism, which XML does not. The tree system facilitates easy access by external systems by producing tabular output, in a manner similar to the relational model. Unlike the relational model, however, it is possible to support diverse structures within the same search space. Finally, the tree model supports a simple external interface using a tree-valued language that can be used by external systems.

In this system, data, queries, and masks are represented by trees. For instance, queries are represented by special kinds of trees, known as partially-bound trees, where parts of the tree are defined to be any allowable structure, i.e., unbound. Masks are also represented as special kinds of trees, where parts of the tree are undefined. Masks may be used to generate Query Trees. Accordingly, queries and masks can be manipulated using the same operations as the underlying data. By representing data, queries, and masks as trees, storage and operations between trees are simplified.

According to one aspect of the invention, a method is disclosed for navigating a collection of tree data structures stored in a computer-readable database, the method including constraining a first node of a query tree stored in a computer-readable memory to a first value, and making accessible a first set of nodes of the query tree that are logically connected (hereinafter "connected") to the first node constrained to the first value. The method also includes constraining a second node in the first set of nodes to a second value. Additionally, the method identifies a tree in the collection of tree data structures that contains (1) a first matching node equal in position to the first node and equal to the first value, and (2) a second matching node equal in position to the second node and equal to the second value. Data in a select node of the identified tree is accessed. The select node may be the first matching node, the second matching node, or a node connected to the first or second matching nodes of the identified tree.

The method for navigating a collection of tree data structures may further include making accessible a second set of nodes of the query tree that are connected to the second node constrained to the second value. The select node is equal in position to the first node of the query tree, the second node of the query tree, or a node in the accessible first or second sets of nodes of the query tree. In an exemplary embodiment, the first value and the second value are selected from the group consisting of a data value, an unbound special value, and an undefined special value.

According to another aspect of the invention, in a computer system having a graphical user interface including a display device and one or more input devices, a method is disclosed for navigating a collection of tree data structures stored in a computer-readable database. This method includes receiving a first value from the one or more input devices to which a first node of a query tree stored in a computer-readable memory is constrained, and displaying with the display device a first set of nodes of the query tree that are connected to the first node constrained to the first value. This method also includes identifying a tree in the collection of tree data structures that contains a first matching node equal in position to the first node and equal to the first value, and displaying with the display device data in a select node of the identified tree. In an exemplary embodiment, the select node is the first matching node or a node connected to the first matching node of the identified tree.

This method may further include receiving a second value from the one or more input devices to which a second node in the first set of nodes is constrained, and displaying with the display device a second set of nodes of the query tree that are connected to the second node constrained to the second value. In one example, the first value and the second value are selected from the group consisting of a data value, an unbound special value, and an undefined special value.

In one scenario, identifying the tree identifies a tree in the collection of tree data structures that contains (1) a first matching node equal in position to the first node and equal to the first value, and (2) a second matching node equal in position to the second node and equal to the second value. In this case, the select node is the first matching node, the second matching node, or a node connected to the first or second matching nodes of the identified tree.

In another scenario, identifying the tree identifies a plurality of trees in the collection of tree data structures that contain (1) a first matching node equal in position to the first node and equal to the first value, and (2) a second matching node equal in position to the second node and equal to the second value. In this case, displaying the data in the select node displays data in a plurality of select nodes of each of the identified plurality of trees. Each of the plurality of select nodes are the first matching node, second matching node, or a node connected to the first or second matching nodes of the respective identified trees. Also, each of the plurality of select nodes are equal in position to the first node of the query tree, the second node of the query tree, or a node in the first or second sets of nodes of the query tree. Displaying the data in the plurality of select nodes may display, via the display device, the data of the plurality of select nodes in a tabular format. Also in this scenario, the method may further include displaying the query tree in a constraint pane, wherein the first set of nodes and the second set of node are displayed in the constraint pane. The data in the plurality of select nodes is displayed in a data pane.

According to yet another aspect of the invention, a system is disclosed for navigating a collection of tree data structures. The system includes a database component operative to maintain a database of tree data structures, a memory component operative to store a query tree, an input component, a display component, and a processing component. The processing component is communicatively connected to the database component, the memory component, the input component, and the display component. Further, the processing component performs actions including interpreting a first signal from the input component as an instruction to constrain a first node of the query tree to a first value, and constraining the first node of the query tree to the first value. The processing component performs actions further including transmitting an instruction to the display component to display a first set of nodes of the query tree that are connected to the first node constrained to the first value. The processing component also communicates with the database component to identify a tree in the database of tree data structures that contains a first matching node equal in position to the first node and equal to the first value. The processing component is additionally programmed to transmit an instruction to the display component to display data in a select node of the identified tree. In one example, the select node is the first matching node or a node connected to the first matching node of the identified tree.

The processing component may also be programmed to perform actions further comprising interpreting a second signal from the input component as an instruction to constrain a second node in the first set of nodes to a second value, and constraining the second node to the second value. In this case, the processing component transmits an instruction to the display component to display a second set of nodes of the query tree that are connected to the second node constrained to the second value. Also in this case, communicating with the database component communicates with the database component to identify a tree in the database of tree data structures that contains (1) a first matching node equal in position to the first node and equal to the first value, and (2) a second matching node equal in position to the second node and equal to the second value. In this scenario, the select node is the first matching node, the second matching node, or a node connected to the first or second matching nodes of the identified tree. Also, the select node is equal in position to the first node of the query tree, the second node of the query tree, or a node in the first or second set of nodes of the query tree. Further, in this example, the first value and the second value are selected from the group consisting of a data value, an unbound special value, and an undefined special value.

According to still yet another aspect of this invention, a method is disclosed for updating a collection of tree data structures in a computer-readable database. This method includes applying a mask to input data to generate a query tree. The mask, the input data, and the query tree each correspond to a tree data structure. This method also includes storing the query tree in a computer-readable memory, applying the query tree to the collection of tree data structures in the database to identify an identified tree consistent with the query tree, deleting the identified tree from the database, and adding the input data to the database. The input data may include a data node having a value, the mask may have an extending node at a same relative position as the data node, and the query tree may include a query node at the same relative position as the data node and the extending node. In this case, when the mask is applied to the input data to generate the query tree, the extending node propagates the value of the data node to the query node, and the identified tree comprises an identified node having the same relative position as the query node and having the value of the query node. The collection of tree data structures may include heterogeneous data.

In one example of this method for updating a collection of tree data structures, the input data may be a unit of input data and the method may further include receiving a set of input data comprising a plurality of input data including the unit of input data, each of the set of input data corresponding to a tree data structure. In this case, the method also includes generating the mask by identifying a common characteristic among the set of input data, storing the mask in a computer-readable memory, and adding the set of input data to the database. The common characteristic among the set of input data includes a matching node in each of the input data, wherein each matching node has a same value and a same relative position as every other matching node. Further, generating the mask generates the mask to have an extending node having the same relative position as each of the matching nodes, and the query tree includes a query node having the same relative position as each of the matching nodes and the extending node. When the mask is applied to the unit of input data to generate the query tree, the extending node propagates the value of the unit of input data's matching node to the query node. Additionally, the identified tree includes an identified node having the value and the same relative position as the query node.

This method for updating a collection of tree data structures may also include applying the mask to a second set of input data to generate a plurality of query trees each corresponding to a tree data structure, and each of the input data of the second set of input data corresponding to a tree data structure. In this scenario, the method includes storing the plurality of query trees in a computer-readable memory, and applying the plurality of query trees to the collection of tree data structures in the database to identify a plurality of identified trees consistent with at least one of the plurality of query trees. The plurality of identified trees from the database are deleted and the second set of input data are added to the database. Also in this case, each of the input data of the second set of input data comprises a data node, and each data node has (1) a value and (2) a same relative position as every other data node. The mask has an extending node at the same relative position as each of the data nodes, and each of the plurality of query trees includes a query node at the same relative position as each of the data nodes and the extending node. When the mask is applied to the second set of input data to generate the plurality of query trees, the extending node propagates the value of each of the data nodes to each of the respective query nodes. The query nodes each have a different value, and the plurality of identified trees each include an identified node having the same relative position as each of the query nodes and having a same value as one of the query nodes.

According to still yet another aspect of this invention, a system is disclosed for updating a collection of tree data structures. The system includes a database component operative to maintain a database comprising the collection of tree data structures, a memory component, an input component, and a processing component. The processing component is communicatively connected to the database component, the memory component, and the input component. The processing component performs actions including receiving input data from the input component, the input data corresponding to a tree data structure, and applying a mask to the input data to generate a query tree, the mask and the query tree each corresponding to a tree data structure. The processing component is also programmed for storing the query tree with the memory component, and applying the query tree to the tree data structures in the database to identify an identified tree consistent with the query pattern. The processing component instructs the database component to delete the identified tree from the database and to add the input data to the database. The collection of tree data structures in the database may include heterogeneous data.

In an example of this system for updating a collection of tree data structures, the input data is a unit of input data, and the processing component performs actions further including receiving a set of input data comprising a plurality of input data including the unit of input data, each of the set of input data corresponding to a tree data structure, and generating the mask by identifying a common characteristic among the set of input data. In this case, the processor is also programmed for storing the mask with the memory component and instructing the database component to add the set of input data to the database. The common characteristic among the set of input data comprises a matching node in each of the input data, wherein each matching node has a same value and a same relative position as every other matching node. Also in this example, generating the mask generates the mask to have an extending node having the same relative position as each of the matching nodes, and the query tree includes a query node having the same relative position as each of the matching nodes and the extending node. When the mask is applied to the unit of input data to generate the query tree, the extending node propagates the value of the unit of input data's matching node to the query node. Further, the identified tree includes an identified node having the value and the same relative position as the query node.

In another example of this system for updating a collection of tree data structures, the input data comprises a data node having a value. The mask has an extending node at a same relative position as the data node, and the query tree comprises a query node at the same relative position as the data node and the extending node. In this case, when the mask is applied to the input data to generate the query tree, the extending node propagates the value of the data node to the query node. And, the identified tree comprises an identified node having the same relative position as the query node and having the value of the query node.

The processing component of this system for updating a collection of tree data structures may be programmed to perform actions further including applying the mask to a second set of input data to generate a plurality of query trees, each corresponding to a tree data structure, and each of the input data of the second set of input data corresponding to a tree data structure. In this case, the processor is also programmed for storing the plurality of query trees with the memory component, and applying the plurality of query trees to the tree data structures in the database to identify a plurality of identified trees consistent with at least one of the plurality of query trees. The processor may instruct the database component to delete the plurality of identified trees from the database and to add the second set of input data to the database. In this case, each of the input data of the second set of input data comprises a data node, and each data node has (1) a value, and (2) a same relative position as every other data node. The mask has an extending node at the same relative position as each of the data nodes, and each of the plurality of query trees comprises a query node at the same relative position as each of the data nodes and the extending node. When the mask is applied to the second set of input data to generate the plurality of query trees, the extending node propagates the value of each of the data nodes to each of the respective query nodes. The query nodes each have a different value, and the plurality of identified trees each comprise an identified node having the same relative position as each of the query nodes and having a same value as one of the query nodes.

According to still yet another aspect of this invention, a method is disclosed for processing a collection of tree data structures in a computer-readable database. This method includes identifying a set of trees in the collection of tree data structures, each tree in the set of trees having a same structure. The method also includes forming a pattern having the same structure as each tree in the set of trees, and processing the pattern. The pattern is processed in lieu of processing each tree in the set of trees. Also, processing the pattern may comprise applying a query tree to the pattern.

In one example of this method for processing a collection of tree data structures, each tree in the set of trees includes a leaf node having a value, and the method further includes storing the pattern in a computer-readable memory, and storing the leaf node of each tree in the set of trees in a computer-readable memory. The pattern is stored in lieu of storing the same structure of each tree in the set of trees.

According to still yet another aspect of this invention, a second method is disclosed for processing a collection of tree data structures in a computer-readable database. This method includes partitioning the collection of tree data structures into disjoint sets of trees, each set of trees comprising trees of a same structure. The method also includes forming a set of patterns, each pattern corresponding to one of the sets of trees, and each pattern having the same structure as its corresponding set of trees. Further, the method includes processing the set of patterns. The set of patterns are processed in lieu of processing each tree in each of the sets of trees, and includes applying a query tree to each pattern in the set of patterns. Additionally, processing the set of patterns may process the set of patterns with distributed processors, each distributed processor processing one or more of the patterns in the set of patterns.

In one example of this second method for processing a collection of tree data structures, each tree in each of the sets of trees includes a leaf node having a value, and the method further includes storing the set of patterns in a computer-readable memory, and storing the leaf node of each tree in each of the sets of trees in a computer-readable memory. The set of patterns are stored in lieu of storing a structure of each tree in each of the sets of trees.

According to still yet another aspect of this invention, a system is disclosed for processing a collection of tree data structures. The system includes a database component operative to maintain a database comprising the collection of tree data structures and a processing component communicatively connected to the database component. By communicating with the database component, the processing component performs actions including identifying a set of trees in the collection of tree data structures, each tree in the set of trees having an identical structure. The processing component is also programmed for forming a pattern having the identical structure as each tree in the set of trees, and processing the pattern. The processing component processes the pattern in lieu of processing each tree in the set of trees.

This system may further include an input component communicatively connected to the processing component. In such a case, the processing component performs actions further comprising receiving information from the input component and generating a query tree based upon the received information. Also in this case, processing the pattern by the processing component includes applying the query tree to the pattern.

This system may further include a memory component communicatively connected to the processing component. Also, each tree in the set of trees includes a leaf node. The processing component stores the pattern with the memory component and stores the leaf node of each tree in the set of trees with the memory component. The pattern is stored in lieu of storing the same structure of each tree in the set of trees.

According to still yet another aspect of this invention, a second system is disclosed for processing a collection of tree data structures. This system includes a database component operative to maintain a database comprising the collection of tree data structures and a processing component communicatively connected to the database component. The processing component performs actions including partitioning the collection of tree data structures in the database into disjoint sets of trees, each set of trees comprising trees having an identical structure, and the partitioning being assisted by communicating with the database component. The processing component is also programmed for forming a set of patterns, each pattern corresponding to one of the sets of trees, and each pattern having the same structure as its corresponding set of trees. Further, the processing component processes the set of patterns. The processing component processes the set of patterns in lieu of processing each tree in each of the sets of trees. Additionally, the processing component may comprise multiple distributed processors, each multiple distributed processor processing one or more of the patterns in the set of patterns.

This system may also include an input component communicatively connected to the processing component. In this case, the processing component performs actions further including receiving information from the input component, and generating a query tree based upon the received information. The processing component processes the set of patterns by applying the query tree to each pattern in the set of patterns.

This system may further include a memory component communicatively connected to the processing component. Also, each tree in each of the sets of trees includes a leaf node, and the processing component is additionally programmed for storing the set of patterns with the memory component, and storing the leaf node of each tree in each of the sets of trees with the memory component. The set of patterns are stored in lieu of storing a structure of each tree in each of the sets of trees.

BRIEF DESCRIPTION OF THE DRAWINGS

A more complete understanding of this invention may be obtained from a consideration of this specification taken in conjunction with the drawings, in which:

FIGS. 2a and 2b comprise one example of the process of constraining a query tree in the UI of FIG. 1;

FIG. 3 is an exemplary table of the results of the query of FIG. 2;

FIG. 4 is an example showing further constraining of the query tree of FIG. 2b;

FIG. 5 is an exemplary table of the results of the query of FIG. 4;

FIG. 6 is yet another example of further constraining of the query tree shown in FIG. 4;

FIG. 7 is an exemplary table of the results of the query of FIG. 6;

FIG. 8 is an example of the concepts of specialize and generalize in accordance with an exemplary embodiment of this invention;

FIG. 9 is an example of an intersect operation according to an aspect of this invention;

FIG. 10 is an example of an intersect operation of FIG. 9 with an "undefined" constraint;

FIG. 11 is an example of an intersect operation of FIG. 9 with both "unbounded" and "undefined" nodes;

FIG. 12 is an example of an extend operation with both "unbounded" and "undefined" nodes in accordance with another aspect of this invention;

FIG. 13 is an example of trees that specialize the result of the extend operation of FIG. 12;

FIG. 14 is a query tree for isolating particular trees for an exemplary update operation in accordance with an aspect of this invention;

FIG. 15 is a specialized query tree that identifies a subset of the trees isolated in FIG. 14, which are to be deleted from the database as part of the update operation;

FIG. 16 is an exemplary mask to generate query trees that identify trees from the database that are to be deleted as part of the update operation;

FIG. 17 is a query tree generated by the mask of FIG. 16 when applied to the set of input data shown in Table 4;

FIG. 18 are two query trees generated by the mask of FIG. 16 when applied to the set of input data shown in Table 6;

FIG. 19 is a tree structure for "IRSwaptionVol" in accordance with another example of this invention;

FIG. 20 represents the key generated by the mask of FIG. 16 for the "IRSwaptionVol" example;

FIG. 21 is a mask that generates a query tree for single tree update in accordance with another example of this invention;

FIG. 22 is a query tree generated by the mask of FIG. 21 for single tree deletion as part of the update;

FIG. 23 is a compact representation of the mask of FIG. 16;

FIG. 25 illustrates a novel technique according to the present invention to implement operations efficiently on collections of trees.

DETAILED DESCRIPTION

Navigation of a Collection of Trees Using a Query Tree

Figure 1:
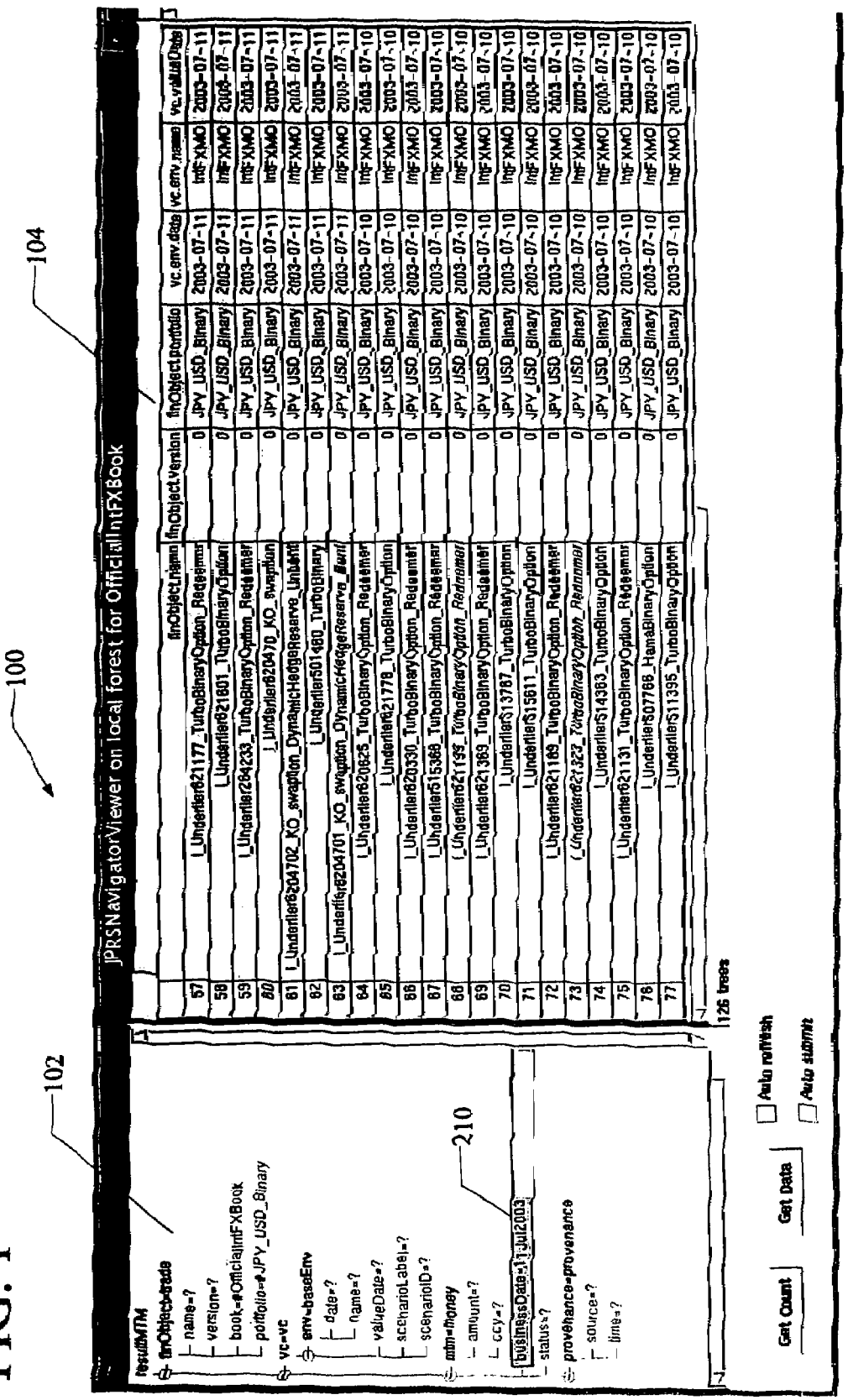
FIG. 1 is a screen shot illustrating a forest navigator user interface (UI) in accordance with one aspect of this invention.

FIG. 1 is a screen shot illustrating a forest navigator user interface (UI) 100 in accordance with one aspect of this invention. The forest navigator enables the user to navigate a collection of tree data structures without being constrained by the manner in which the data is stored. The user constructs a query in constraint pane 102 (on the left), and may extract tabular data into data pane 104 (on the right). The query shown in constraint pane 102 has a tree data structure, and is herein referred to as a query tree. The query tree is typically stored in a computer readable memory in the computer which is executing the underlying program associated with UI 100. The query tree operates on a collection of trees stored in a database, which is itself a computer readable memory. Typically, the query tree is stored in a volatile memory and the collection of trees are stored in a non-volatile memory, which is the database.

Each row of the query tree shown in constraint pane 102 identifies a node in the query tree. Each node in the query tree has a node name and a node value, represented herein with a description of the node name, followed by an equal sign ("="), which is then followed by a description of the node value. For instance, the second row of the query tree shown in the constraint pane 102 in FIG. 1, includes the text "finObject=trade." Therefore, the node shown at the second row of the query tree has the node name "finObject" and the node value "trade." However, the root node of the query tree is represented only by the node value for simplicity. For instance, the node shown at the first row of the query tree having the text "resultMTM" is the root node having the value "resultMTM." One skilled in the art will understand that the first row of the query tree is the root node and, therefore, the node name "root" is left out.

The layout of the query tree shown in constraint pane 102 of FIG. 1 also identifies the structure of the query tree, which is ultimately limited by the available structures of the trees in the database. Nodes are descendants of nodes they are indented from, and nodes are ancestors of nodes that are indented below them. Also, nodes are "connected" to ancestor nodes at the immediately prior indenting level and descendant nodes at the immediately following indenting level. For instance, the node shown at the second row of the query tree at 102 in FIG. 1 has the node name "finObject" and the node value "trade." This node is connected to the node at the immediately prior indenting level "resultMTM," which is its parent node and the root node. The "finObject=trade" node is also connected to the node "portfolio=#JPY_USD_Binary," which is its child node and is shown at row six of the query tree. These display conventions are used throughout this description and accompanying figures.

FIGS. 2a and 2b illustrate the steps in which a user navigates the collection of trees by constraining the query tree shown in constraint pane 102 to identify particular trees for which data is to be shown in a tabular format in data pane 104 of FIG. 1. Table 200 comprises four columns labeled "Steps" 202, "Query Tree" 204, "Choice" 206 and "No. Trees" 208. In FIGS. 2a and 2b, column two, query tree 204, shows the query tree in the constraint pane 102 in the forest navigator UI 100 (FIG. 1). A row in bold shows a node name or node value that has been selected by the user. The third column, choice 206, shows the set of available node values for a selected node name. When a node value is selected for a node name, the node is said to be "constrained" to the selected node value. In FIGS. 2a and 2b, when a node is constrained to a value in one step (row), the updated query tree having the constrained node is shown in column 204 of the next step (row). The rows are numbered in order to demonstrate that the interaction consists of a sequence of steps 202 At each step, the node values available to the user are themselves constrained by the set of trees in the forest being navigated. The fourth column, No. Trees 208, shows the number of trees in the forest (collection of trees) which contain the constrained nodes of the query tree in the second column 204. This example shows how expansion of the query in the constraint pane 102 of FIG. 1 results in a reduction of the navigable data. (No. Trees 208).

Walking through the constraint process of FIGS. 1, 2a and 2b, processing starts at step 1 (FIG. 2a). The Query Tree 204 is Unconstrained ("?") 210. Stated another way, the root node of the query tree is unbound, which is indicated by the symbol "?" 210. In step 1, the user selects the root node of the query tree at 210, typically by using a mouse, as is known in the art, to move a cursor over the node in the constraint pane 102 and clicking a mouse button. Other types of input devices or components known in the art, besides a mouse, may be used. No matter what type of input device is used, the input device generates a signal that is interpreted by a processor as an instruction. In this case, the instruction is to select the root node. Once selected, the possible node values for the root node are displayed to the user, as shown in column 206, step 1. The available node values are defined by the data in the collection of trees in the database, and in this embodiment, the possible root node values are "resultCashflow," "resultMTM" and "resultPosition." In this example, the user selects, using the input component, value "resultMTM" 212, thereby constraining the root node to this value.

Processing now moves to step 2, where the query tree column 204 displays the set of possible child nodes for a root node constrained to value "result MTM" 212. At this time, and at each time the query tree is further constrained, the processor of the computer operating this system may automatically communicate with the database to search for all trees in the collection of trees that have a root node with value "resultMTM" 212. More generally, an attempt is made to identify trees within the collection of trees that have a node ("matching node") equal in position to the root node of the query tree and equal in value to that of the root node, which in this case is "resultMTM" 212. As shown in column 208 of FIG. 2a, only 4,780,652 trees of the 11,187,650 total number of trees in the database have a root node with value "resultMTM" 212. This searching process may occur automatically every time the query tree is further constrained, or may occur when prompted by the user. Data within trees that are identified from the search are then displayed in data pane 104. The process of displaying data in the data pane 104 is discussed in more detail with reference to FIGS. 3, 5, and 7.

Proceeding with the example of FIG. 2a, step 2, the user then selects one of the exposed child nodes of the root node. In this case, the user selects the node "businessDate" 214, which currently has an unbound node value "?." Once the "businessDate" node 214 is selected, the possible values for this node are shown in column 206. In this case, the user decides to constrain the "businessDate" node 214 to "14 Jul. 2003" 216. Again, once this node is constrained, a search of the database may be performed. This time, the search attempts to identify all trees which have (1) a node equal in position to the root node and equal in value to "resultMTM" 212, and (2) a node equal in position to node "businessDate" 214 and equal in value to "14 Jul. 2003" 216. As shown in column 208 of FIG. 2a, only 522,404 trees in the collection of trees meet this criteria.

In step 3, the user selects the node "vc=" 218 in column 204. There is only one possible node value for this node, which is "vc" 220, as shown in column 206. Therefore, the user decides to select node value "vc" 220 for this node. When node "vc" 218 is constrained to node value "vc" 220, the query tree is expanded to expose a second set of possible child nodes "env," "valueDate," "scenarioLabel," and "scenarioID," as shown in column 204, step 4. These four child nodes are children of node "vc" 218 and are grandchildren of the root node 212.

In step 4, the user selects one of these child nodes "env" 222 in order to reduce the total number of trees 208 further. In this example, the user selects the node value "baseEnv" 224 in column 206 for node "env" 222. This selection results in the query tree of step 5 in column 204, which reveals possible child nodes for the node "env" when constrained to value "baseEnv" 224. The user then further constrains the query by selecting the node "finObject" 226, which currently has the unbound value "?." The user then selects the value "trade" 228 in choice column 206.

Figure 2C:
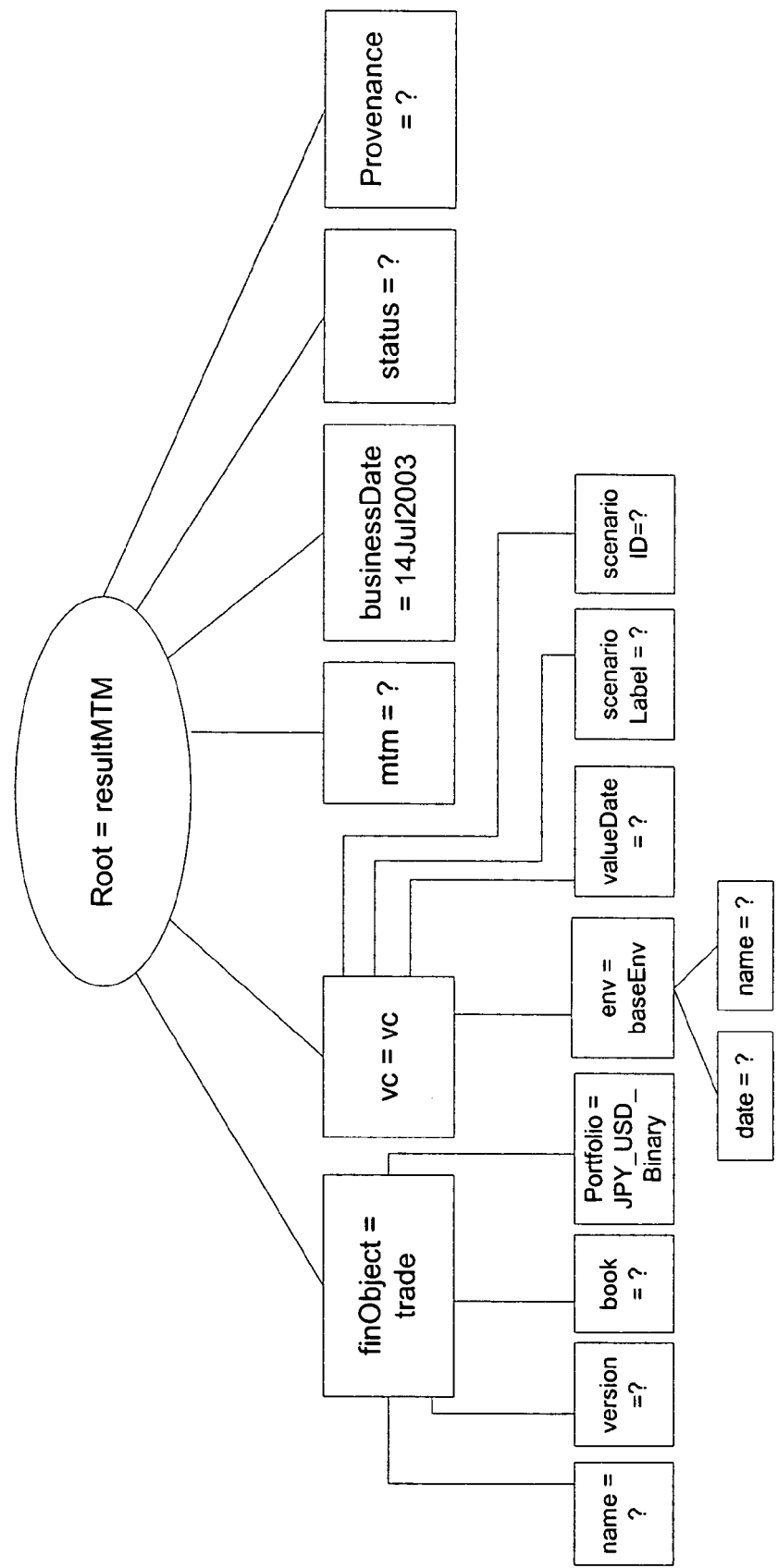
FIG. 2c is a alternate view of the query tree shown at step 7, column 204 of FIG. 2b.

Turning now to FIG. 2b, when the "finObject" node 226 is constrained to value "trade" 228, the query tree in column 204 of step 6 reveals possible child nodes "name," "version," and "portfolio." In step 6, the user constrains the node "portfolio" 230 to value "JPY_USD_Binary" 232 shown in column 206. The node "portfolio" 230, when constrained to value "JPY_USD_Binary" 232 is a leaf node because there are no possible child nodes for this node. Therefore, the resulting query tree shown in column 204, step 7 does not show any child nodes for the node "portfolio" 230 with value "JPY_USD_Binary" 232. The query tree shown in column 204, step 7 may alternately be viewed or conceptualized as illustrated in FIG. 2c. There are 126 trees (in step 7, column 208, FIG. 2b) that include the constrained nodes of the query tree shown in column 204, step 7, FIGS. 2b and 2c. Another way to describe the trees in the collection of trees (forest) which include the constrained nodes of the query tree is to say there are 126 trees that are "generalized" by the query tree.

At any step in column 202, the user can select any of the nodes displayed in the query tree for which a node value is to be viewed in tabular format in the data pane 104 of FIG. 1. By being able to view the data in the complex tree data structures in a tabular format, the present invention allows the user to readily export data to be compatible with relational database systems. FIG. 3 shows an example of nodes selected for node value viewing when the query tree is as shown at step 7, column 204 of FIG. 2b. In FIG. 3, the columns of the table correspond to the node names of the nodes which have been selected for data viewing. Although leaf nodes are most commonly selected for node value viewing, it is not required that only leaf nodes be selected. The rows of the table correspond to the values of the selected nodes for the trees in the forest which are generalized by the query. As can be seen in FIG. 3, not all nodes need to be included in the data pane 104. In the example of FIG. 3, the names of the nodes selected for value viewing are "finObject.name" 302, "finObject.version" 304, "finObject.book" 306, "finObject.portfolio" 230, "vc.env.date" 308, "vc.env.name" 310, "vc.valueDate" 312, "businessDate" 214, and "status" 314. It should be noted that the node names shown in FIG. 3 include the names of ancestor nodes before each period. For example, the node name "vc.env.date" 308 indicates that the parent of the node "date" is "env," and the grandparent is "vc". The root node "resultMTM" is left out to avoid redundancy.

Turning now to FIG. 4, a chart of further constraints following the chart of FIGS. 2a and 2b and the resulting table of FIG. 3, is shown. In step 8, the user selects the node "mtm" 402 in order to additionally view the market-to-market prices for the previously selected trades. The user selects the node value "money" 404 in choice column 206 for node "mtm" 402. The further constrained query tree is shown in step 9, which displays child nodes "amount" 502 and "ccy" 504 for the node having the node name "mtm" 402 and node value "money" 404. Node values from select nodes of trees generalized by the query tree of step 9, column 204, are shown in FIG. 5. The same number of trees is selected as in steps 7 and 8 (126), but the table of FIG. 5 includes the node values for the child nodes named "mtm.amount" 502 and "mtm.ccy" 504.

The navigation example is continued at FIG. 6, which shows further constraining of the query tree constrained in FIGS. 2a, 2b, and 4. In step 10 of FIG. 6, the user selects the node "provenance" 602. In the choice column 206 the user selects the only available node value "provenance" 604. The node "provenance" 602 constrained to "provenance" 604 has possible child nodes "source" and "time" as shown in the expanded query tree at step 11, column 204. Node values for select nodes are shown in tabular form in FIG. 7. FIG. 7 includes the node values for the child nodes "provenance.source" 702 and "provenance.time" 704 for five trees that are generalized by the query tree of step 11, column 204, FIG. 6.

The query tree can also be edited without changing its structure, as in a traditional query-by-example application. For example, the user can select the "businessDate" node 214 (step 2, FIG. 2a) and constrain it to a different node value such as "11 Jul. 2003" in order to look at related data in the data pane 104 of FIG. 1 for a different business day. Further, it should be noted that the process of constraining the query tree described above may occur in reverse, where the user unconstrains a node in the query tree, and the number of trees 208 increase. In effect, the steps described in FIGS. 2a, 2b, 4, and 6 can occur in reverse.

Tree Comparisons

Queries and updates make use of a pattern matching operation in accordance with another aspect of this invention. The pattern matching operation takes two trees as input and compares corresponding subtrees in each. Special node values Unbound (written "?") and Undefined (written "_") indicate allowable values and allowable subtree structure for any node having the special value.

The special value Unbound indicates any value and any subtree structure, whereas Undefined indicates no value and no subtree structure. Unbound generalizes all nodes having the same relative position and Undefined specializes all nodes having the same relative position. In other words, if a node "businessDate" of a query tree has an unbound node value, and a tree "X" in the collection of trees has a node "businessDate" with a node value of "14 Jul. 2003" in the same relative position as the node "businessDate" in the query tree, the node in the query tree "generalizes" the node in tree X. On the other hand, if the node "businessDate" in the query tree has an undefined special value, the node in the query tree "specializes" the node in tree X. A tree is complete if it has no special values.

Having two special values makes it possible to define a number of tree constructors as binary operations on trees. For example, a tree whose leaves are all special values can be used as a mask in the following manner. The mask operation takes a target tree and a mask and returns the tree created by removing all the subtrees in the target that correspond to undefined nodes in the mask. The unmasked part of the target may be identical in structure to the mask, or it may correspond to an unbound node in the mask. This means that a single mask may be used on a large variety of targets.

The unbound value is used to represent the parts of the mask where no constraint is applied to the substructure in the target; whereas the undefined value is used to represent those parts of the mask, where all substructures are to be removed from the target.

The use of two special values allows the user to distinguish the two cases where:

1. the substructure is unconstrained; and
2. the substructure is constrained to be empty.

In the first case, any grammatical substructure is allowed. In the second case, there is no substructure.

Four trees are illustrated in FIG. 8, each illustrating a node "perturbation" 802 constrained by "tweak" 804. Perturbation 802 constrained by tweak 804 has three child nodes: "curve" 806, "point" 808 and "tweakSpec" 810a. The node tweakSpec 810a, when constrained to the node value "tweakSpec" 810b, has a child node "spec" 812. Spec 812, when constrained to the node value "perturbationSpec" 814 has child nodes "direction" 816 and "amount" 818. For purposes of this example, node direction 816 has the value "UP" and leaf node amount 818 has the value "1." Because node direction 816 and node amount 818 have no child nodes when constrained to these particular values, they are deemed leaf nodes.

As illustrated in Tree 2, curve 806 may have the value "irCurve" 820. Curve 806, when constrained to the value irCurve 820, has child node "ccy" 823, as illustrated in Tree 2. Node ccy 823 is illustrated herein as having the value "USD."

Curve 806 may also have the value "irSwaptionVol" 824, as illustrated in Tree 3 and Tree 4. Curve 806 when constrained to the value "irSwaptionVol" 824 has a child node "ccy" 822 and "index" 826. Ccy 822 and Index 826 is illustrated as having a values of "USD" and "SWAP," respectively.

As shown in Tree 2, point 808 maybe have the value "curvePoint" 828. When node point 808 is constrained to curvePoint 828, it has a child node "maturity" 830. In the example of Tree 2, maturity 830 has the value of "1Y." As shown in Tree 4, point 808 may also have the value "irVolPoint" 832, which has the child nodes maturity 830, with value "1Y" and "tenor" 834 having an unbound special value.

Continuing with FIG. 8, the partial trees of FIG. 8 show examples of specialize and generalize. Tree 1 has the node curve 806 with an Unbound ("?") special value, whereas the corresponding node curve 806 in Tree 2 is bound to value, irCurve 820. Similarly, the node point 808 is Unbound in Tree 1, but the node point 808 is bound to curvePoint 828 in Tree 2. Finally, the node tweakSpec 810a, is constrained to the same value tweakSpec 810b in both Tree 1 and Tree 2.

A node having an Unbound value generalizes any bound node, so each unbound node in Tree 1 either generalizes or is equal to the corresponding node in Tree 2. In this case, we say that Tree 1 "generalizes" Tree 2, because the nodes of Tree 1 having the same relative position as the nodes of Tree 2 are either unbound or equal to the corresponding nodes in Tree 2. Equal in this context means equal in value and equal in subtree structure (or substructure). For instance, curve 806 and point 808 are unbound in Tree 1, and tweakSpec 810a in Tree 1 is equal in value and substructure to the tweakSpec 810a node in Tree 2, both of which occupy the same relative position in each tree.

Stated the opposite way, Tree 2 "specializes" Tree 1 because Tree 2 contains no unbound values and because the nodes of Tree 2 specify values and subtree structure for corresponding unbound nodes in Tree 1 or have values and subtree structure that are equal to the corresponding nodes in Tree 1.

Continuing in FIG. 8, Tree 1 generalizes Tree 3. But, in this case, the subtree structure for point 808 is only partially bound (i.e., one child node of point 808, tenor 834, is Unbound). Also, note that Tree 2 and Tree 3 have different structures (i.e., curve 806, and point 808). However, both Tree 2 and Tree 3 specialize Tree 1. Tree 1 also generalizes Tree 4. In this case, the value for node tweakSpec 810a in Tree 4 is Undefined. Any bound value generalizes Undefined, so the bound value for tweakSpec 810a in Tree 1 generalizes the corresponding undefined predicate value 810a in Tree 4.

Now compare Tree 2 and Tree 3 in FIG. 8. In this case, the node curve 806 in Tree 2 is bound to value irCurve 820, whereas the node curve 806 in Tree 3 is bound to value irSwaptionVol 824. The node values are not equal and neither specializes the other; therefore, Tree 2 excludes Tree 3.

Finally, compare Tree 3 and Tree 4 in FIG. 8. The node curve 806 in Tree 3 specializes the corresponding node curve 806 in Tree 4. The node point 808 is the same in both trees, and the node tweakSpec 810a in Tree 3 generalizes the corresponding node in Tree 4. We say that Tree 3 overlaps Tree 4.

In summary:

All nodes specialize corresponding Unbound nodes "?";
Undefined nodes "_" specialize all corresponding nodes;
All nodes generalize corresponding Undefined nodes "_"; and
Unbound nodes "?" generalizes all corresponding nodes.

Given the definitions of specialize and generalize for corresponding nodes, specialize and generalize may further be defined for any two trees, t1 and t2:

1.) t1 specializes t2 iff every node in t1 specializes, or is equal to, the corresponding predicate in t2;

2.) t1 generalizes t2 iff every predicate in t1 generalizes, or is equal to, the corresponding predicate in t2;

3.) the relation specialize is the inverse of generalize; for any two trees t1 and t2, t1 specializes t2 iff t2 generalizes t1; and 4.) the relations are transitive. For instance, if t1 specializes t2 and t2 specializes t3, then t1 specializes t3. On the other hand, if t1 generalizes t2 and t2 generalizes t3, then t1 generalizes t3.

Tree Operations

Having defined specialize and generalize, the query operation may now be defined in accordance with another aspect of this invention. The query operation takes a query tree (or partial tree) as input and returns all the trees in a given forest that specialize or are equal to, the query tree.

There are two other important operations on trees, called intersect and extend. Each operation takes two trees as input and returns a single tree as output. Both operations work by comparing corresponding nodes (nodes having the same relative position) in the two input trees. The value of each node may be a data type (e.g., a string, float, or a user-defined data type), or it may be one of the special values unbound or undefined. For each pair of corresponding nodes, the input types determine the result. Table 1 presents the rules that define intersect, wherein "v" represents a value of type data type (i.e., not a special value), and nodes 1 and 2 are corresponding nodes in the two input trees. The result node is the node of the output tree that corresponds to nodes 1 and 2 of the input trees.

TABLE 1

| Node 1 (n1) | Node 2 (n2) | Result (r) |
|---|---|---|
| n1 = ? | n1 = _ | r = _ |
| n1 = _ | n1 = ? | r = _ |
| n1 = ? | n2 = v | r = v |
| n1 = _ | n2 = v | r = _ |
| n1 = v | n2 = ? | r = v |
| n1 = v | n2 = _ | r = _ |
| n1 = v | n2 = v | r = v |
| n1 = v1 | n2 = v2 | r = _ |

In words:
if either of the nodes has an Undefined value, the result is a node with an Undefined value;
if one of the nodes has an Unbound value and the other has value v, the result is a node with value v;
if both nodes have different values, v1 and v2, the result is a node with an Undefined value; and
if both nodes have the same value, v, the result is a node with value v.

As illustrated in Table 2, the rules that define extend are similar. In fact, extend is the dual of intersect, where "_" and "?" are interchanged.

TABLE 2

| Node 1 (n1) | Node 2 (n2) | Result (r) |
|---|---|---|
| n1 = _ | n2 = ? | r = ? |
| n1 = ? | n2 = _ | r = ? |
| n1 = ? | n2 = v | r = ? |
| n1 = _ | n2 = v | r = v |
| n1 = v | n2 = ? | r = ? |
| n1 = v | n2 = _ | r = v |
| n1 = v | n2 = v | r = v |

TABLE 2-continued

| Node 1 (n1) | Node 2 (n2) | Result (r) |
|---|---|---|
| n1 = v1 | n2 = v2 | r = ? |

In words, the rules for extend are:
if either of the nodes is Unbound, the result node is Unbound;
if one of the nodes is Undefined and the other has value v, the result node has value v;
if both nodes have different values, v1 and v2, the result node is Unbound;
if both nodes have the same value, v, the result node has value v.

The operation intersect is symmetrical, so intersect(t1,t2)=intersect(t2,t1)

Also, there is a close relationship between intersect and specialize. For example,
if
   t3=intersect(t1,t2)
then
   t3 specializes t1
and
   t3 specializes t2

More generally, any tree that specializes either of t1 and t2 will also specialize t3. The result of intersect is like the highest common factor of the two inputs: it is the most general tree that specializes both of the inputs.

Similarly, the following relationships hold for extend and generalize.

extend(t1,t2)=extend(t2,t1)

And,
if
   t3=extend(t1,t2)
then
   t3 generalizes t1
and
   t3 generalizes t2

The result of extend is similar to the lowest common denominator of the two inputs: it is the most specialized tree that generalizes both of the input trees.

FIG. 9 shows a simple example of the operation intersect using the same nodes of FIG. 8. The two input trees are shown in the first two columns, labeled Tree 1 and Tree 2, with the result tree in the third, labeled Result. The node curve 806 is bound to value irSwaptionVol 824 in Tree 1 and is Unbound in Tree 2; so the result is equal to the bound value irSwaptionVol 824 with corresponding subtree structure in the result column.

FIG. 10 illustrates another example of the operation intersect. The Unbound value of curve 806 in Tree 2 of FIG. 9 has been substituted for the Undefined value in Tree 2 in FIG. 10. Now the node curve 806 is bound to irSwaptionVol 824 in Tree 1 and is Undefined in Tree 2; so the result curve 806 in Tree 3 is Undefined.

In FIG. 11, Tree 2 contains both the Unbound (curve 806 and tweakspec 810a) and Undefined (point 808) special values. When tree 2 is intersected with Tree 1, the effect is to mask out the value and subtree structure at node point 808.

The term mask is used to refer to the use of a special value to block out the value and associated subtree structure of a node in one of the input trees.

Turning now to FIG. 12 is an example illustrating extend. Tree 2 is used to extend Tree 1. In the operation of FIG. 12, the bound node curve 806 and node point 808 of Tree 1 extended by the Unbound node curve 806 and node point 808 of Tree 2 results in an Unbound node curve 806 and node point 808 in the Result tree. The bound node tweakSpec 810a in Tree 1 extended by the undefined node tweakSpec 810a in Tree 2 yields the bound node tweakSpec 810a in the Result tree.

FIGS. 12 and 13 illustrate further examples of "extend." Each of Tree 1, Tree 2 and Tree 3 of FIG. 13, when extended by the mask of Tree 2 in FIG. 12, results in the Results Tree of FIG. 12. These results are achieved for the same reasons as the results of FIG. 12 (see also TABLE 2).

The examples of FIGS. 12 and 13 illustrate how a mask may be used to generate "keys" for the purpose of database update. A database update is the process of replacing "old" data in a database with "new" data. When performing a database update, the "old" data is commonly identified and deleted, and then the "new" data is inserted into the database in place of the "old" data. A "key," in the context of this invention, is a query tree that, when applied to a collection of complete trees (forest) in the database, identifies the trees in the forest that must be deleted (i.e., the "old" data).

Query trees may be generated by applying a mask to a data tree. In particular, the query tree is generated when an extend operation is performed using a data tree (Tree 1, FIG. 12, for example) and a mask (Tree 2, FIG. 12, for example) as input. The output of such an extend operation is a query tree.

When the mask (Tree 2, FIG. 12, for example) is applied to a data tree, the parts of the data tree (Tree 1, FIG. 12, for example) that correspond to an Undefined node in the mask are propagated to the resulting query tree (Result, FIG. 12, for example). Further, parts of the input tree from the database that correspond to an Unbound node in the mask become Unbound in the resulting query tree. In the case of FIG. 12, a query tree (Result) has been generated from Tree 1 and Tree 2 that will identify all trees in the database that have nodes curve 806 and point 808 with any value and associated subtree structure, but only the given value and associated subtree structure for tweakSpec 810a using the query operation previously described. Once such trees have been identified, they may be deleted if performing an update function. However, this method may also be used merely as a searching mechanism, and is not only applicable for a database update.

These examples are intended to illustrate the use of trees to specify operations on complex data. They are based on use cases from the field of financial risk management. The tree structures are based on complex, real-time models, but they have been simplified to make the examples clearer. Further, these examples have been chosen to illustrate operations on trees, rather than to illustrate best practice in financial modeling.

Update

As discussed above, a database update is typically implemented as a deletion followed by an addition. Conceptually, the deletion will remove all existing trees that are in some way equivalent to those that are to be added. However, the exact nature of the equivalence often depends on the context of the application. For example, consider the following two update use cases for risk results:

(a) all the risk points for a given trade are updated, and replaced by a new set; and (b) a single risk point for a given trade is updated, leaving all other risk points unchanged.

Note that in general (a) is not equivalent to repeated application of (b), because the new set may include different risk indicators or have a different number of elements.

The application developer needs to specify a set of query patterns that will select all the trees to be deleted in each use case. The problem is that the individual trees in the set of updates may all have different structures, and, therefore, the required query is different for each of the possible structures.

The solution to this problem is to specify the update operation using a tree mask. The mask makes use of undefined and unbound nodes. When the mask is applied to a data tree, the parts of the data tree corresponding to undefined parts of the mask are left unchanged, whereas the parts of the data tree corresponding to unbound parts of the mask become unbound. This results in a query tree with constrained nodes matching the parts of the data tree corresponding to the undefined parts of the mask. A single mask may generate many different query patterns depending upon the data tree it is applied to. This process will be explored in detail in the following two use cases.

Update: Use Case 1

For purposes of describing this use case scenario, assume a database containing a collection of tree data structures. Also assume that the constraint pane 102 (FIG. 1) contains the query tree shown in FIG. 14 so as to isolate a particular subset of trees in the collection of trees. Node values for the isolated subset of trees are shown in Table 3 below, which reflects the data that would be shown in the data pane 104 of FIG. 1. (It should be noted that the first row of each of Tables 3-10 indicate parent nodes and their corresponding constrained values. The second rows of each of Tables 3-10 indicate child node names of the parent nodes immediately above them. Rows three and greater in Tables 3-10 each indicate a tree having values at the child nodes indicated in the second row of the table.

TABLE 3

| finObject = trade | curve = irCurve | point = curvePoint | spec = perturbationSpec | delta = money |
|---|---|---|---|---|
| name | ccy | mat | dir | amt | amt |
| Trade1 | EUR | 1Y | UP | 1 | +25 |
| Trade1 | EUR | 2Y | UP | 1 | +20 |
| Trade1 | EUR | 3Y | UP | 1 | +05 |
| Trade1 | EUR | 1Y | DN | 1 | −20 |
| Trade1 | EUR | 2Y | DN | 1 | −15 |
| Trade1 | EUR | 3Y | DN | 1 | −10 |
| Trade1 | USD | 1Y | UP | 1 | +25 |
| Trade1 | USD | 2Y | UP | 1 | +15 |
| Trade1 | USD | 3Y | UP | 1 | +05 |
| Trade2 | EUR | 1Y | UP | 1 | +20 |
| Trade2 | EUR | 2Y | UP | 1 | +05 |
| Trade2 | EUR | 3Y | UP | 1 | −20 |

The query tree of FIG. 14, which isolates the trees partially described in Table 3, includes a root node having the value "resultPosition" 1402 and includes many of the node names and node values previously discussed. The root node (having value ResultPosition 1402) includes three child nodes: "FinObject" 1404, "vc" 218 and "delta" 1406. FinObject 1404 is constrained to value "trade" 1408, which has node "name" 1410 as a child node. Node name 1410 is unbound.

Vc 218 is constrained to value "vc" 220 and has child node "env" 222. Node env 222 is constrained to value "perturbEnv" 1412 and has child node "perturbation" 802. Node perturbation 802 is constrained to value "tweak" 804 and has three child nodes: "curve" 806, "point" 808 and "tweakSpec" 810a (as used in the examples of FIGS. 8-13, above). In this example, curve 806 is constrained to value irCurve 820, which has child node "ccy" 823, which is unbound. Point 808 is constrained to value "curvePoint" 828, which has "maturity" 830 as an unbound child node.

Tweakspec 810*a* is constrained to value tweakSpec 810*b*, which has spec 812 as a child node. Spec 812 is constrained to value "perturbationSpec" 814, which includes "direction" 816 and "amount" 818 as child nodes, both of which are unbound.

The node "delta" 1406 is constrained to value "money" 1414, which has "amount" 1416 as an unbound child node.

Having set forth the query tree and the set of trees identified by the query tree, use case 1 will now be described. Use case 1 concerns an update operation. Suppose that risk exposure results for a portfolio of trades have been calculated and stored, but it is then decided to revalue the EUR Interest Rate Zero Curve (IRZero) exposure for one of the trades based on a different set of shift sizes ("tweak" 804 amounts). The new exposure values are based on an upward shift and they are to replace any existing EUR exposure values based on an upward shift. The existing results that were computed using a downward shift are to be left unchanged, as are results for other trades. In the original computation, the trade had exposure to three points (1Y, 2Y, 3Y) on the EUR curve, but in the new computation there is exposure to an additional point (4Y).

The newly computed exposures ("new" or "input" data) are represented as tree data structures that are to be inserted into the set of trees shown in Table 3 in place of the originally computed exposures ("old" data). Node values of the "input" data are shown in Table 4. The rows in Table 4 each represent node values of one of the trees of input data, each tree representing one new exposure. Table 4 is therefore considered a set of input data to be added to the database in place the older data they are replacing. Note the extra 4Y point.

TABLE 4

| finObject = trade | curve = irCurve | point = curvePoint | spec = perturbationSpec | | delta = money |
|---|---|---|---|---|---|
| name | ccy | mat | dir | amt | amt |
| Trade1 | EUR | 1Y | UP | 5 | +29 |
| Trade1 | EUR | 2Y | UP | 5 | +19 |
| Trade1 | EUR | 3Y | UP | 5 | +05 |
| Trade1 | EUR | 4Y | UP | 5 | +04 |

The update involves two basic steps: delete all "old" data and replace it with the "input" data, as shown in Table 4. The "old" data includes all trees described in Table 3 having name=Trade1, ccy=EUR and direction=UP. In accordance with one aspect of this invention, a simple way to identify the trees for deletion is to define explicitly a query pattern that matches the required results. Such explicit pattern matching is shown in FIG. 15. In FIG. 15, name 1410 is defined as "Trade1" 1502, ccy 823 is defined as "EUR" 1504 and direction 816 is defined as "UP" 1506. (For purposes of this specification, only those fields of interest are labeled in the interest of clarity.)

By performing the query operation using the query tree of FIG. 15 on the set of trees described in Table 3, the trees described at the first three rows of Table 3 are identified (and deleted). Once the identified trees have been deleted, the input data of Table 4 are inserted into the database, revealing the updated set of trees described in Table 5, which would be displayed in data pane 104 of FIG. 1 when the query tree in constraint pane is that of FIG. 14.

TABLE 5

| finObject = trade | curve = irCurve | point = curvePoint | spec = perturbationSpec | | delta = money |
|---|---|---|---|---|---|
| name | ccy | mat | dir | amt | amt |
| Trade1 | EUR | 1Y | UP | 5 | +29 |
| Trade1 | EUR | 2Y | UP | 5 | +19 |
| Trade1 | EUR | 3Y | UP | 5 | +09 |
| Trade1 | EUR | 4Y | UP | 5 | +04 |
| Trade1 | EUR | 1Y | DN | 1 | −20 |
| Trade1 | EUR | 2Y | DN | 1 | −15 |
| Trade1 | EUR | 3Y | DN | 1 | −10 |
| Trade1 | USD | 1Y | UP | 1 | +25 |
| Trade1 | USD | 2Y | UP | 1 | +15 |
| Trade1 | USD | 3Y | UP | 1 | +05 |
| Trade2 | EUR | 1Y | UP | 1 | +20 |
| Trade2 | EUR | 2Y | UP | 1 | +05 |
| Trade2 | EUR | 3Y | UP | 1 | −20 |

The query tree of FIG. 15, used to identify the "old" data, matches all the results that are to be deleted and no others. However, the query tree is specific to this particular update and could not be reused if, say, it was required to update the exposure results for USD. In general, the problem with defining an explicit query tree for update is that it does not allow reuse: e.g., every trade-currency combination would require a different query tree.

A better approach is to generate the required query tree from input values, in accordance with another aspect of this invention. The required query tree can be derived using tree operators. Thus, instead of making a query tree that matches the results directly, a mask is generated that is applied to the input data in order to generate one or more query trees (or patterns). When this mask is applied to the collection of trees in the database, it identifies only those trees that must be deleted in order to complete the update. An exemplary mask is given in FIG. 16. In FIG. 16, nodes name 1410, ccy 823 and direction 816 all have the undefined ("_") special value. The mask is applied to the input data using the extend operation, previously described, to generate one or more query trees. "Applied to" in this context means that the extend operation takes the mask and one of the input data trees as input, and derives a query tree as an output. The process is repeated for each input data tree, wherein duplicate query trees are either deleted or not generated.

When the mask of FIG. 16 is applied to the input data of Table 4, the generated query tree is the same for each and is shown in FIG. 17, wherein name 1410 is constrained to value "Trade1" 1502, ccy 823 is constrained to value "EUR" 1504, and direction 816 is constrained to value "UP" 1506. Duplicate query trees are deleted, thereby leaving one query tree of the type shown in FIG. 17. Note that there is a slight difference between the query tree of FIG. 17 and the query tree of FIG. 15. The query tree specified in FIG. 15, which was generated by matching the characteristics of the trees to be deleted, includes "point=curvePoint 828" whereas the query tree of FIG. 17, generated based upon the input data, is non-specific about the value of node "point" at 1702. This difference indicates that the query tree of FIG. 17 generalizes the query tree of FIG. 15 and consequently has broader applicability.

The mask of FIG. 16 can be used generally. For example, assume that a recomputation for USD produces a second set of input data trees. Assume also that the values of several of the nodes for each of the new input trees are as shown in Table 6.

TABLE 6

| finObject = trade | curve = irCurve | point = curvePoint | spec = perturbationSpec | | delta = money |
|---|---|---|---|---|---|
| name | ccy | mat | dir | amt | amt |
| Trade1 | USD | 1Y | UP | 2 | +22 |
| Trade1 | USD | 2Y | UP | 2 | +12 |
| Trade1 | USD | 2Y | DN | 2 | −12 |
| Trade1 | USD | 2Y | DN | 2 | −32 |

This time the mask of FIG. 16, when applied to the second set of input data shown in Table 6, produces two distinct query trees (keeping in mind that duplicate query trees are deleted). These query trees are shown in FIG. 18. In query tree 1, name 1410 has the value "Trade1" 1502, ccy 823 is constrained to "USD" 1802 (to reflect the change in the currency of interest), and direction 816 is constrained to "UP" 1506. Query tree 2 is generated because direction 816 is undefined in the mask shown in FIG. 16 and the set of input data, as shown in Table 6, includes differing values for node direction 816. Therefore, query tree 2 is the same as query tree 1, except that direction 816 is set to "DN" 1804.

After one or more distinct query trees have been generated, the query trees are applied to the collection of trees in the database using the query operation, previously discussed, to identify which trees are to be deleted. In the case of the query trees shown in FIG. 18, the first query tree will identify the three trees shown in Table 5 having a USD value for node ccy 823. There are no trees having a "DN" value for node "direction" 816 in the table, so the second query tree does not identify any trees from the portion of the database shown in Table 5. After the identified trees have been deleted, and the new data from Table 6 added, the data pane 104 would appear as shown in Table 7 when the query tree in constraint pane 102 is as shown in FIG. 14.

TABLE 7

| finObject = trade | curve = irCurve | point = curvePoint | spec = perturbationSpec | | delta = money |
|---|---|---|---|---|---|
| name | ccy | mat | dir | amt | amt |
| Trade1 | EUR | 1Y | UP | 5 | +29 |
| Trade1 | EUR | 2Y | UP | 5 | +19 |
| Trade1 | EUR | 3Y | UP | 5 | +09 |
| Trade1 | EUR | 4Y | UP | 5 | +04 |
| Trade1 | EUR | 1Y | DN | 1 | −20 |
| Trade1 | EUR | 2Y | DN | 1 | −15 |
| Trade1 | EUR | 3Y | DN | 1 | −10 |
| Trade1 | USD | 1Y | UP | 2 | +22 |
| Trade1 | USD | 2Y | UP | 2 | +12 |
| Trade1 | USD | 2Y | DN | 2 | −12 |
| Trade1 | USD | 2Y | DN | 2 | −32 |
| Trade2 | EUR | 1Y | UP | 1 | +20 |
| Trade2 | EUR | 2Y | UP | 1 | +05 |
| Trade2 | EUR | 3Y | UP | 1 | −20 |

In the next example, the mask of FIG. 16 is modified by changing the value of "curve" 806 from "irCurve" 820 (FIG. 16) to undefined, as shown in FIG. 19. Such modification broadens the applicability of the mask, so that a single mask may be used to update a forest containing trees of different structures. In this example, the mask of FIG. 19 is applied to the input data shown in Table 8 below. Notably, the data in Table 8 below has a different structure than that of the input data shown in Tables 4 and 6. For example, node "curve" in Table 8 is constrained to "irSwaptionVol", whereas, node "curve" in Tables 4 and 6 are constrained to "irCurve." In spite of these differences, the mask of FIG. 19 can be applied to all of these sets of input data.

TABLE 8

| finObject = trade | curve = irSwaptionVol | | point = irVolPoint | | spec = perturbation Spec | | delta |
|---|---|---|---|---|---|---|---|
| name | ccy | index | mat | tnr | dir | amt | amt |
| Trade1 | AUD | SWAP | 1Y | 5Y | UP | 10 | +22 |
| Trade1 | AUD | SWAP | 2Y | 5Y | UP | 10 | +12 |
| Trade1 | AUD | SWAP | 2Y | 5Y | UP | 10 | −12 |
| Trade1 | AUD | SWAP | 2Y | 5Y | UP | 10 | −32 |

When the mask of FIG. 19 is applied to the input data shown in Table 8, the query tree of FIG. 20 is generated. Because the input data has node "curve" constrained to value "irSwaptionVol", as shown in Table 8, the entire substructure of node "curve," including child nodes "ccy" and "index," is propagated to the query tree, as shown in FIG. 20. In particular, the query tree of FIG. 20 has node "curve" 806 bound to "irSwaptionVol" 824, child node "ccy" 822 bound to "AUD" 2002, and child node "index" 826 bound to "SWAP" 2004. Further, node "direction" 816 is bound to value "UP" 1506.

The generated query tree of FIG. 20 is then used to identify trees in the database that must be removed prior to inserting the new data shown in Table 8.

Update: Use Case 2

Use Case 1 dealt with updating a category of data, or a set of trees having one or more common characteristics. In contrast, Use Case 2 deals with updating a single tree in a forest. Performing a single tree update is no different than performing a group update, except that the query tree must be more specialized to focus in on only one tree in the database. Thus, a more specific query tree is generated using a mask having more nodes with undefined values.

For example, assume that the "new" data to be inserted into the database is as shown in Table 9, and that the current state of the relevant part of the database is as shown in Table 7.

TABLE 9

| finObject = trade | curve = irCurve | point = curvePoint | spec = perturbationSpec | | delta = money |
|---|---|---|---|---|---|
| name | ccy | mat | dir | amt | amt |
| Trade2 | EUR | 3Y | UP | 5 | −29 |

In order to update properly the database with the data in Table 9, a query tree must be generated that would identify only the tree described at the last row of Table 7. A mask that would produce such a query tree is shown in FIG. 21. In FIG. 21, perturbation 802 is constrained to value tweak 804. Name 1410, curve 806, point 808, and direction 816 are all undefined ("_"). Applying the mask of FIG. 21 to the input tree whose leaf values are shown in Table 9, is shown in FIG. 22. The query tree of FIG. 22 has node name 1410 constrained to value "Trade2" 2204. The query tree also has node curve 806 constrained by irCurve 820, which has child node ccy 823 constrained to value "EUR" 1504. Further, point 808 is constrained to value curvePoint 828, which has child node maturity 830, which is constrained to value "3Y" 2202. Finally, direction 816 has a value of "UP" 1506.

Applying the query tree of FIG. 22 to the collection of trees in the database singles out only the last tree in Table 7 for deletion. Because of this, only this specific tree will be replaced with the input tree whose node values are shown in Table 9. After deleting the single tree from Table 7 and inserting the input data tree shown in Table 9, thereby completing the update, the data pane 104 appears as shown in Table 10 when the query tree in constraint pane 102 is as shown in FIG. 14.

TABLE 10

| finObject = trade | curve = irCurve | point = curvePoint | spec = perturbationSpec | | delta = money |
|---|---|---|---|---|---|
| name | ccy | mat | dir | amt | amt |
| Trade1 | EUR | 1Y | UP | 5 | +29 |
| Trade1 | EUR | 2Y | UP | 5 | +19 |
| Trade1 | EUR | 3Y | UP | 5 | +09 |
| Trade1 | EUR | 4Y | UP | 5 | +04 |
| Trade1 | EUR | 1Y | DN | 1 | −20 |
| Trade1 | EUR | 2Y | DN | 1 | −15 |
| Trade1 | EUR | 3Y | DN | 1 | −10 |
| Trade1 | USD | 1Y | UP | 2 | +22 |
| Trade1 | USD | 2Y | UP | 2 | +12 |
| Trade1 | USD | 2Y | DN | 2 | −12 |
| Trade1 | USD | 2Y | DN | 2 | −32 |
| Trade2 | EUR | 1Y | UP | 1 | +20 |
| Trade2 | EUR | 2Y | UP | 1 | +05 |
| Trade2 | EUR | 3Y | UP | 5 | −29 |

Compact Textual Representation of Trees

In the preceding examples, unbound nodes are explicitly shown in order to make the examples clearer. However, unbound nodes do not need to be shown in the textual representation of trees. Where no value has been specified for a tree, the unbound node will be supplied by default. Thus, it would have been possible to represent the trees discussed throughout this description in a more compact textual form. For example, the mask of FIG. 16 could be as shown in FIG. 23, wherein unbound nodes point 808, amount 818, and amount 1416 are not shown.

The textual representation of the tree data structures used throughout this description can be used to easily interface with external applications. For instance, if the tree data structures are stored in a textual format, such as those shown in the accompanying figures, then external applications can easily search and import the data with an appropriate interface.

Exemplary Hardware Implementation

Figure 24:
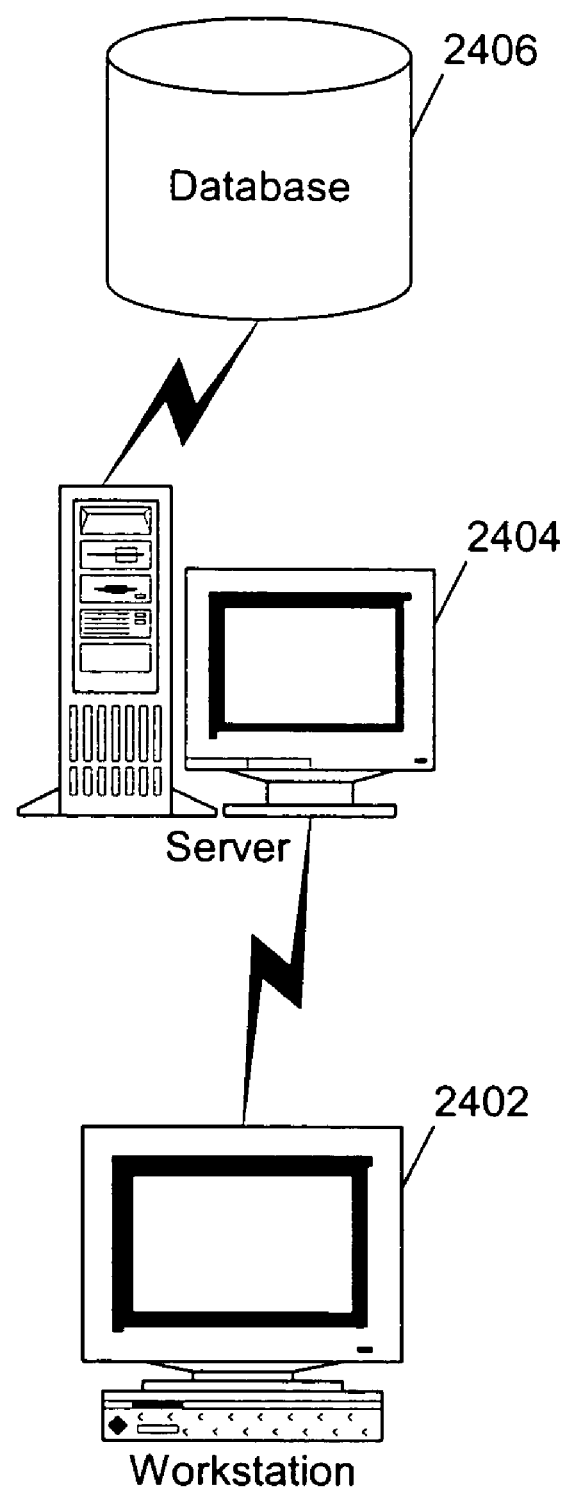
FIG. 24 is an exemplary hardware arrangement implementing the present invention.

The present invention may be implemented with the hardware arrangement shown in FIG. 24. In particular, a user accesses the UI 100 of FIG. 1 via workstation 2402. When a user constrains the query tree in constraint pane 102 via an input device, query operations (and other user requested operations) are processed via server 2404. The server 2404, in turn, communicates with the database 2406 which contains the collection of tree data structures according to the present invention. Although shown separately, the database is typically included within the server 2404. However, the database 2406 may be stored on the workstation 2402, making the server 2404 unnecessary. The server 2404 is used in cases where multiple users must access the database 2406, or when the database 2406 is too large to store on a workstation. When no server 2404 is present, the actual processing is done by the processor in the workstation 2402, instead of the processor in server 2404.

When the server 2404 is present, the manner of communication between the workstation 2402 and the server 2404 can be of any means known in the art, such as direct wired communication or wireless communication. The workstation 2402 may communicate with the server 2404 via a network, such as a local area network, an intranet, or the Internet, or any other network configuration as is known in the art. When a network is used to communicate between workstation 2402 and server 2404, multiple users may have access to the system. For instance, multiple workstations 2402 may be used, wherein each user has access to the UI 100 shown in FIG. 1, and each user may make requests to the database 2406 via server 2404.

Communication between the workstation 2402 and its display apparatus, such as a monitor, occurs using methods known in the art.

Efficient Implementation of Operations on a Collection of Trees

The present invention also includes a novel tree storage technique that reduces the amount of storage required by the database to store the collection of tree data structures, and reduces response times for operations performed on the collection of tree data structures. The problems with performing operations on a large collection of trees having heterogeneous data are that these types of data structures are often very expensive to store and process in terms of storage capacity and response time. Pairwise operations on trees, such as intersect and extend require a traversal of the two trees, where nodes of each of the input trees are matched, paired, and transformed. The traversal is performed recursively until the leaves of the tree are reached. When an operation is applied across a collection of trees, the traversal must be performed for every pairing of trees.

Further, each tree structure is composed of many nodes and arcs. This structure can impose a heavy implementation cost in terms of space and time. The large storage requirements result from the cost of creating and copying tree structures because each node has an independent copy of its children.

The novel technique of the present invention, described with reference to FIG. 25, alleviates these problems. First, the collection of trees in the database are partitioned into disjoint sets of trees 2502, wherein each tree 2504 within each set 2502 has the same structure. A pattern 2506 matching the structure of each set of trees 2502 is then generated, creating a set of patterns 2508. Having extracted the structure of each of the sets of trees 2502 as patterns 2508, the set of patterns 2508 are then stored in the database instead of storing the complete structure of every tree 2504. Therefore, only one structure 2506 is stored for each set of trees 2502.

Further, the leaf nodes for each tree 2510 are extracted from each tree 2504 and separately stored as sets of leaves 2512. Each set of leaves 2512 correspond to the leaves from one tree 2510. Accordingly, instead of storing the complete tree structure, including leaf nodes, for every tree 2504 in the collection of trees, all that is stored are the set of patterns 2508 and the sets of leaves 2512, thereby reducing required storage amounts for the database.

This technique also decreases response time for operations performed on the collection of trees. Having stored the patterns 2508 and leaves 2512 separately, many tree operations can be decomposed into an operation on the patterns 2506 and an operation on the leaves 2512. The operation on a pattern 2506 need only be performed once for the set of trees to which the pattern corresponds to, rather than once for each tree in the corresponding set. If an operation on a pattern 2506 excludes a set of trees 2502, significant processing time is saved, thereby decreasing response time.

Response time is further reduced by this technique because the arrangement of FIG. 25 lends itself to distributed processing. Because each set of trees 2502 are known to be disjoint, processing on each set of trees 2502 (and associated pattern 2506) can be delegated to different processors to be processed independently, thereby reducing response time.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method for processing a collection of tree data structures in a computer-readable database, the method comprising:
   identifying a plurality of disjoint sets of trees in the collection of tree data structures, each tree in the respective set of trees having a same structure and including at least one leaf node having a value;
   for each of the plurality of disjoint sets of trees, forming a pattern having the same structure as each tree in the set of trees thereby generating a set of patterns;
   storing the set of patterns in a computer-readable memory in lieu of storing the plurality of sets of trees corresponding to each pattern;
   storing the at least one leaf node of each tree of each of the sets of trees in a computer-readable memory;
   associating each pattern in the set of patterns with the at least one leaf node of each tree in the set of trees corresponding to the pattern; and
   processing the set of patterns with distributed processors, wherein each distributed processor processes one or more of the patterns in the set of patterns.

2. The method of claim 1 wherein the set of patterns is processed in lieu of processing each tree in the plurality of disjoint sets of trees.

3. The method of claim 1 wherein processing the set of patterns comprises applying a query tree to at least a portion of the set of patterns.

4. The method of claim 1 wherein processing the set of patterns comprises applying an extend operation to at least a portion of the set of patterns.

5. The method of claim 1 wherein processing the set of patterns comprises applying an intersect operation to at least a portion of the set of patterns.

6. A system for processing a collection of tree data structures, the system comprising:
   a database component operative to maintain a database comprising the collection of tree data structures;
   a processing component communicatively connected to the database component, the processing component programmed to perform actions comprising:
      identifying, by communicating with the database component, a plurality of disjoint sets of trees in the collection of tree data structures, each tree in the respective set of trees having a same structure and including at least one leaf node having a value;
      for each of the plurality of disjoint sets of trees, forming a pattern having the same structure as each tree in the set of trees thereby generating a set of patterns;
      storing the set of patterns in a communicatively connected computer-readable memory in lieu of storing the plurality of sets of trees corresponding to each pattern;
      storing the at least one leaf node of each tree of each of the sets of trees in the computer-readable memory;
      associating each pattern in the set of patterns with the at least one leaf node of each tree in the set of trees corresponding to the pattern; and
      processing the set of patterns with distributed processors, wherein each distributed processor processes one or more of the patterns in the set of patterns.

7. The system of claim 6 wherein the processing component processes the set of patterns in lieu of processing each tree in the plurality of disjoint sets of trees.

8. The system of claim 6 further comprising:
   an input component communicatively connected to the processing component,
   wherein the processing component is programmed to perform actions further comprising:
   receiving information from the input component; and
   generating a query tree based upon the received information,
   wherein processing the set of patterns by the processing component comprises applying the query tree to at least a portion of the set of patterns.

9. The system of claim 6 wherein processing the set of patterns comprises applying an extend operation to at least a portion of the set of patterns.

10. The system of claim 6 wherein processing the set of patterns comprises applying an intersect operation to at least a portion of the set of patterns.

* * * * *